US 12,067,668 B2

(12) United States Patent
Bruce et al.

(10) Patent No.: US 12,067,668 B2
(45) Date of Patent: Aug. 20, 2024

(54) GRAPHICS PROCESSING

(71) Applicant: Arm Limited, Cambridge (GB)

(72) Inventors: Richard Bruce, Cambridge (GB); William Robert Stoye, Cambridge (GB); Mathieu Jean Joseph Robart, Cambridge (GB); Jørn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/805,387

(22) Filed: Jun. 3, 2022

(65) Prior Publication Data

US 2022/0392146 A1 Dec. 8, 2022

(30) Foreign Application Priority Data

Jun. 4, 2021 (GB) ..................................... 2108053

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01); *G06T 2210/21* (2013.01)

(58) Field of Classification Search
CPC .... G06T 15/06; G06T 15/005; G06T 2210/21
See application file for complete search history.

(56) References Cited

U.S. PATENT DOCUMENTS

| 5,197,140 | A | 3/1993 | Balmer |
| 5,475,856 | A | 12/1995 | Kogge |
| 5,588,152 | A | 12/1996 | Dapp et al. |
| 6,272,616 | B1 | 8/2001 | Fernando et al. |
| 7,324,112 | B1 | 1/2008 | Lindholm et al. |
| 7,353,369 | B1 | 4/2008 | Coon et al. |
| 7,999,808 | B1 | 8/2011 | Aila et al. |
| 8,072,454 | B1 | 12/2011 | Aila et al. |

(Continued)

FOREIGN PATENT DOCUMENTS

| EP | 3675046 A1 | 1/2020 |
| JP | 2001148028 A | 5/2001 |

(Continued)

OTHER PUBLICATIONS

Combined Search and Examination Report under Sections 17 and 18(3) dated Nov. 10, 2021, GB Patent Application No. GB2108050.2.

(Continued)

*Primary Examiner* — Yi Yang
(74) *Attorney, Agent, or Firm* — Vierra Magen Marcus LLP

(57) ABSTRACT

There is provided an instruction, or instructions, that can be included in a program to perform a ray tracing operation, with individual execution threads in a group of execution threads executing the program performing the ray tracing operation for a respective ray in a corresponding group of rays such that the group of rays performing the ray tracing operation together. The instruction(s), when executed by the execution threads will cause one or more rays from the group of plural rays to be tested for intersection with a set of primitives. A result of the ray-primitive intersection testing can then be returned for the traversal operation.

17 Claims, 13 Drawing Sheets

(56) References Cited

U.S. PATENT DOCUMENTS

| | | |
|---|---|---|
| 9,063,722 B2 | 6/2015 | Pechanek et al. |
| 9,311,102 B2 | 4/2016 | Shah et al. |
| 10,964,086 B2 | 3/2021 | Croxford et al. |
| 11,315,303 B2 | 4/2022 | Saeed et al. |
| 11,900,522 B2 | 2/2024 | Sideris et al. |
| 2004/0125103 A1 | 7/2004 | Kaufman et al. |
| 2008/0079713 A1 | 4/2008 | Mejdrich et al. |
| 2009/0167763 A1* | 7/2009 | Waechter ............... G06T 15/40 345/426 |
| 2009/0262132 A1 | 10/2009 | Peterson et al. |
| 2010/0033493 A1* | 2/2010 | Nutter .................... G06T 15/50 345/589 |
| 2011/0069067 A1* | 3/2011 | Ozdas .................... G06T 15/06 345/426 |
| 2011/0078690 A1 | 3/2011 | Fahs et al. |
| 2011/0102261 A1* | 5/2011 | Egri ........................ H01Q 1/28 342/368 |
| 2014/0168228 A1* | 6/2014 | Luebke ................. G06F 9/5066 345/505 |
| 2014/0168238 A1 | 6/2014 | Luebke et al. |
| 2015/0262408 A1* | 9/2015 | Lee ........................ G06T 15/06 345/426 |
| 2016/0019066 A1 | 1/2016 | Diamos et al. |
| 2016/0093090 A1 | 3/2016 | Shin et al. |
| 2016/0350960 A1 | 12/2016 | Yi et al. |
| 2019/0057539 A1 | 2/2019 | Standard et al. |
| 2021/0390758 A1 | 12/2021 | Muthler et al. |
| 2022/0392145 A1 | 12/2022 | Bruce et al. |
| 2022/0392147 A1 | 12/2022 | Bruce et al. |
| 2023/0062386 A1 | 3/2023 | Sideris et al. |

FOREIGN PATENT DOCUMENTS

| | | |
|---|---|---|
| WO | 2014068400 A2 | 5/2014 |
| WO | 2016060874 A1 | 4/2016 |

OTHER PUBLICATIONS

Search Report under Section 17 dated Dec. 7, 2021, GB Patent Application No. GB2108052.8.
Combined Search and Examination Report under Sections 17 and 18(3) dated Dec. 9, 2021, GB Patent Application No. GB2108053.6.
Search Report under Section 17(6) dated Jun. 6, 2022, GB Patent Application No. GB2108053.6.
U.S. Appl. No. 17/804,453, filed May 27, 2022.
U.S. Appl. No. 17/805,453, filed Jun. 4, 2022.
Restriction Requirement dated Aug. 3, 2023, U.S. Appl. No. 17/804,453.
Response to Restriction Requirement dated Aug. 8, 2023, U.S. Appl. No. 17/804,453.
Non-Final Office Action dated Nov. 1, 2023, U.S. Appl. No. 17/804,453, 48 pages.
Non-Final Office Action dated Jan. 4, 2024, U.S. Appl. No. 17/805,381, 19 pages.
Non-Final Office Action dated Dec. 7, 2023, U.S. Appl. No. 17/805,453, 38 pages.
Response to Non-Final Office Action dated Mar. 1, 2024, U.S. Appl. No. 17/804,453, 28 pages.
Final Office Action dated Apr. 25, 2024, U.S. Appl. No. 17/804,453, 59 pages.
Response to Non-Final Office Action dated May 7, 2024, U.S. Appl. No. 17/805,453, 13 pages.
Notice of Allowance dated Jun. 3, 2024, U.S. Appl. No. 17/805,453, 32 pages.

* cited by examiner

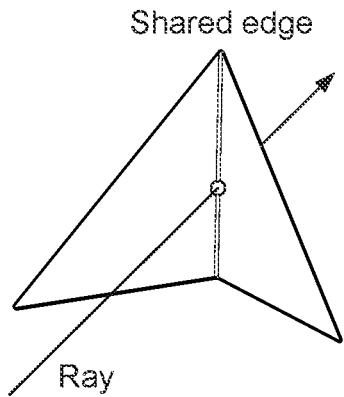
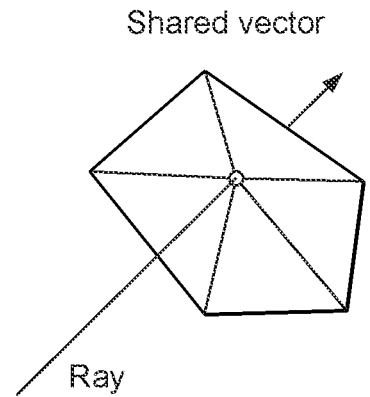
FIG. 12A     FIG. 12B
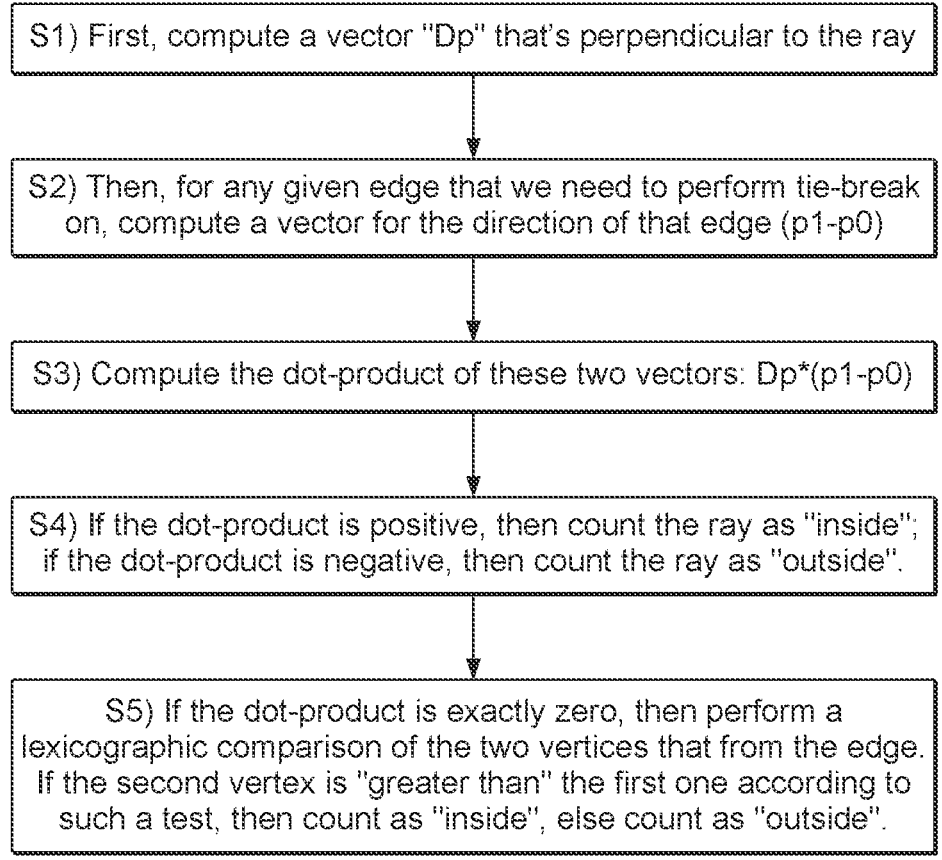
FIG. 13

|    | 31-28 | 27-24 | 23-20 | 19-16 | 15-12 | 11-8 | 7-5 | 3-0 |
|----|-------|-------|-------|-------|-------|------|-----|-----|
| 0  | tri_0_vertex_0_x |||||||| 
| 1  | tri_0_vertex_0_y ||||||||
| 2  | tri_0_vertex_0_z ||||||||
| 3  | tri_0_vertex_1_x ||||||||
| 4  | tri_0_vertex_1_y ||||||||
| 5  | tri_0_vertex_1_z ||||||||
| 6  | tri_0_vertex_2_x ||||||||
| 7  | tri_0_vertex_2_y ||||||||
| 8  | tri_0_vertex_2_z ||||||||
| 9  | tri_1_vertex_0_x ||||||||
| 10 | tri_1_vertex_0_y ||||||||
| 11 | tri_1_vertex_0_z ||||||||
| 12 | tri_1_vertex_1_x ||||||||
| 13 | tri_1_vertex_1_y ||||||||
| 14 | tri_1_vertex_1_z ||||||||
| 15 | tri_1_vertex_2_x ||||||||
| 16 | tri_1_vertex_2_y ||||||||
| 17 | tri_1_vertex_2_z ||||||||
| 18 | tri_2_vertex_0_x ||||||||
| 19 | tri_2_vertex_0_y ||||||||
| 20 | tri_2_vertex_0_z ||||||||
| 21 | tri_2_vertex_1_x ||||||||
| 22 | tri_2_vertex_1_y ||||||||
| 23 | tri_2_vertex_1_z ||||||||
| 24 | tri_2_vertex_2_x ||||||||
| 25 | tri_2_vertex_2_y ||||||||
| 26 | Reserved ||||||||
| 27 | Reserved ||||||||
| 28 | Reserved ||||||||
| 29 | Reserved ||||||||
| 30 | Reserved ||||||||
| 31 |   | V2 |   | O2 | V1 |   | O1 | V0 |   | O0 |

GRAPHICS PROCESSING

CROSS-REFERENCE TO RELATED APPLICATIONS

This application claims priority pursuant to 35 U.S.C. 119(a) to United Kingdom Patent Application No. 2108053.6, filed Jun. 4, 2021, which application is incorporated herein by reference in its entirety.

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value, e.g., sampling point in the image, is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation.

The Applicants believe that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which:

FIGS. 12A and 12B show schematically a ray intersecting an edge or vertex that is shared by multiple primitives;

FIG. 13 is a flow chart illustrating a tie-breaking mechanism that can be used to resolve instances of a ray intersecting a shared edge or vertex;

FIG. 15 illustrates how primitive data for a leaf node of a ray tracing acceleration data structure may be stored in memory.

Like reference numerals are used for like elements in the Figures where appropriate.

DESCRIPTION

Figure 1:
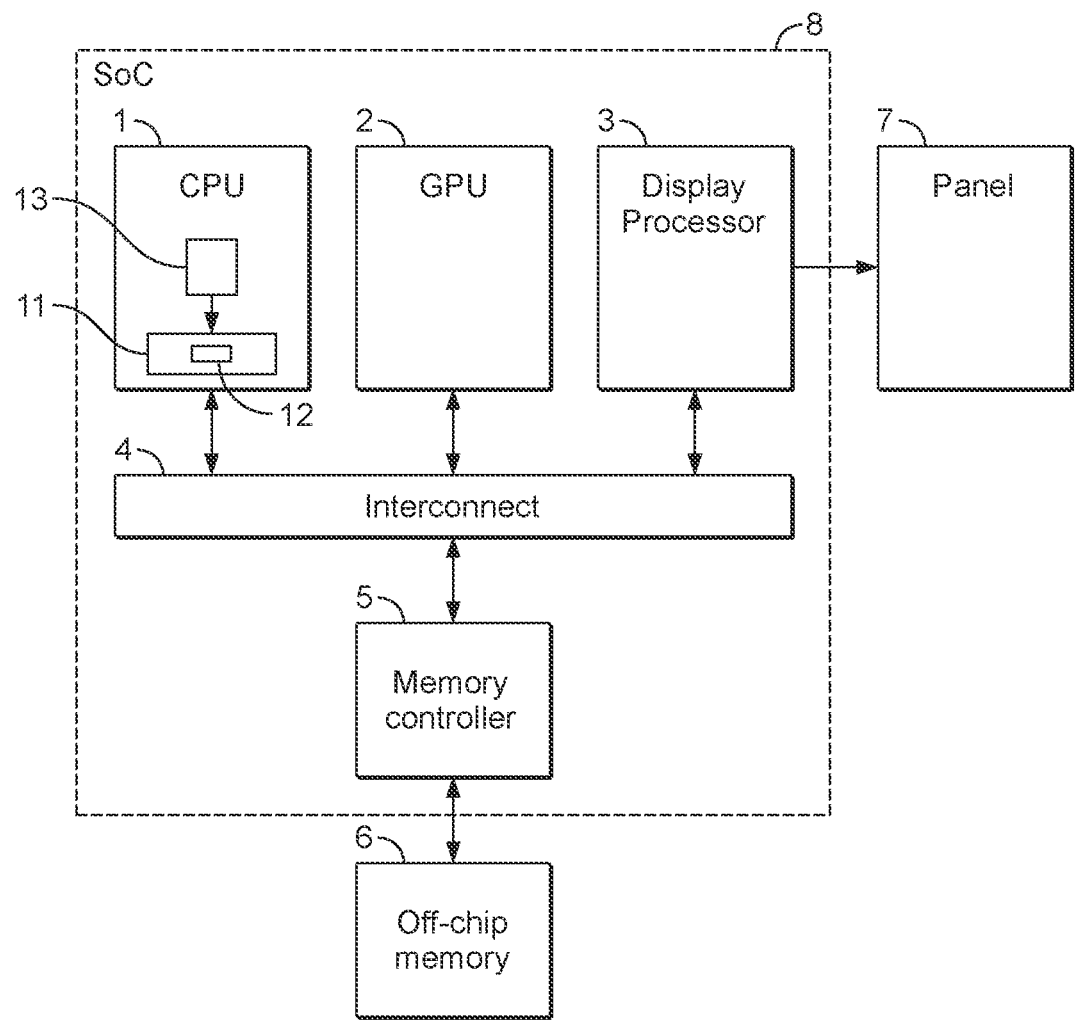
FIG. 1 shows an exemplary graphics processing system.

A first embodiment of the technology described herein comprises a method of operating a graphics processing system including a graphics processor when rendering a frame that represents a view of a scene comprising one or more objects using a ray tracing process, the graphics processor comprising a programmable execution unit operable to execute programs to perform graphics processing operations, and in which a program can be executed by groups of plural execution threads together;

the method comprising:

including in a program to perform a ray tracing operation, wherein the program is to be executed by a group of plural execution threads, with individual execution threads in the group of execution threads performing a ray tracing operation for a respective ray in a corresponding group of rays such that the group of rays performs the ray tracing operation together, a set of one or more 'ray-primitive' testing instructions for testing rays in the group of rays that are performing the ray tracing operation together for intersection with a set of primitives defined for the scene, which set of 'ray-primitive' testing instructions, when executed by execution threads of the group of plural execution threads, will cause:

the graphics processor to test one or more rays from the group of plural rays that are performing the ray tracing operation together for intersection with the primitives in the set of primitives being tested; and a result of the intersection testing to be returned for the ray tracing operation;

the method further comprising, when a group of execution threads is executing the program for a corresponding group of rays that are performing a traversal of the ray tracing acceleration data structure together, in response to the execution threads executing the set of one or more 'ray-primitive testing' instructions in respect of a set of primitives:

testing one or more rays from the group of plural rays that are performing the ray tracing operation together for intersection with the primitives in the set of primitives being tested; and returning a result of the intersection testing for the ray tracing operation.

A second embodiment of the technology described herein comprises a graphics processing system comprising a graphics processor that is operable to render a frame that represents a view of a scene comprising one or more objects using a ray tracing process, the graphics processor comprising a programmable execution unit operable to execute programs to perform graphics processing operations, and in which a program can be executed by groups of plural execution threads together;

the graphics processing system further comprising:

a processing circuit that is configured to:

include in a program to perform a ray tracing operation, wherein the program is to be executed by a group of plural execution threads, with individual execution threads in the group of execution threads performing a ray tracing operation for a respective ray in a corresponding group of rays such that the group of rays performs the ray tracing operation together, a set of one or more 'ray-primitive' testing instructions for testing rays in the group of rays that are performing the ray tracing operation together for intersection with a set of primitives defined for the scene, which set of 'ray-primitive' testing instructions, when executed by execution threads of the group of plural execution threads, will cause:

the graphics processor to test one or more rays from the group of plural rays that are performing the ray tracing operation together for intersection with the primitives in the set of primitives being tested; and a result of the intersection testing to be returned for the ray tracing operation;

wherein the execution unit is configured such that, when a group of execution threads is executing the program for a corresponding group of rays that are performing a traversal of the ray tracing acceleration data structure together, in response to the execution threads executing the set of one or more 'ray-primitive testing' instructions in respect of a set of primitives:

the execution unit triggers testing one or more rays from the group of plural rays that are performing the ray tracing operation together for intersection with the primitives in the set of primitives being tested, wherein a result of the intersection testing is then returned for the ray tracing operation.

The technology described herein broadly relates to the performing of ray tracing on a graphics processor in order to render a frame that represents a view of a particular scene. When performing a ray tracing operation, for each ray that is being used to render a sampling position in the frame that is being rendered, in order to render the sampling position, it first needs to be determined which geometry that is defined for the scene is intersected by the ray (if any).

There are various ways in which this can be done, as desired. However, in general, there may be many millions of graphics primitives within a given scene, and millions of rays to be tested, such that it is not normally practical to test every ray against each and every graphics primitive. To speed up the ray tracing operation, in embodiments of the technology described herein, a ray tracing acceleration data structure, such as a bounding volume hierarchy (BVH), that is representative of the distribution of the geometry in the scene that is to be rendered is used to determine the intersection of rays with geometry (e.g. objects) in the scene being rendered (and then renders sampling positions in the output rendered frame representing the scene accordingly).

The ray tracing process according to an embodiment therefore comprises performing a traversal of the ray tracing acceleration data structure for a plurality of rays that are being used for the ray tracing process, which traversal involves testing the rays for intersection with the volumes represented by the different nodes of the ray tracing acceleration data structure in order to determine with reference to the node volumes which geometry may be intersected by which rays for a sampling position in the frame for the scene that is being rendered, and which geometry therefore needs to be further processed for the rays for the sampling position.

The ray tracing acceleration data structure traversal operation therefore involves traversing the nodes of the ray tracing acceleration data structure, testing rays for intersection with the volumes associated with the nodes, and maintaining a record of which node volumes are intersected by which rays, e.g. to determine which nodes should therefore be tested next for the ray, and so on, down to the end nodes, e.g., at the lowest level, of the ray tracing acceleration data structure.

Once it has been determined, by performing such a traversal operation for a ray, which end nodes represent geometry that may be intersected by the ray, the actual geometry intersections for the ray for the geometry that occupies the volumes associated with the intersected end nodes can be determined accordingly, e.g. by testing the ray for intersection with the individual units of geometry (primitives) defined for the scene that occupy the volumes associated with the leaf nodes. Once the geometry intersections for the rays being used to render a sampling position have been determined, it can then be (and is) determined what appearance the sampling position should have, and the sampling position rendered accordingly.

The ray-primitive intersection testing is generally relatively more computationally expensive. The use of the ray tracing acceleration data structure in embodiments may therefore allow the ray tracing operation to be accelerated.

For instance, rather than testing a ray against each and every individual primitive within the scene, a ray that is being used for the ray tracing process can instead be tested for intersection at a higher level against the volumes represented at each level of the tree data structure, and for any rays that do not intersect a given node in a particular branch of the tree structure it can be determined that the ray does not intersect the geometry falling within the branch of the tree structure including that node, without further testing of the ray against the geometry in the lower levels of the tree.

The use of such a ray tracing acceleration data structure can therefore be effective in speeding up the overall ray tracing operation.

However, the Applicants have recognised that there is still scope for improvement in this regard. In particular, the technology described herein recognises that the efficiency of the ray-primitive intersection testing operation itself can be further improved.

For instance, even with the use of a ray tracing acceleration data structure as described above there may still be a large amount of ray-primitive intersection testing that is required for a given ray tracing operation. Furthermore, attempting to load in the required data for each of the rays being used for the ray tracing operation for performing such ray-primitive intersection testing can involve relatively high memory bandwidth.

The technology described herein therefore aims to improve the overall efficiency of the ray-primitive intersection testing that is required to be performed when performing a ray tracing operation.

This is achieved in the technology described herein by providing an instruction (or set of one or more instructions) that when executed by an execution thread in a group of execution threads performing the ray tracing operation together for a corresponding group of plural rays will trigger 'ray-primitive' intersection testing to be performed for one or more rays in the group of plural rays that are performing the ray tracing operation together.

This has the effect and benefit that multiple rays in a group of plural rays that are performing the ray tracing operation together can then be tested against a set of in an embodiment plural primitives in one processing instance, thus reducing the number of memory access operations.

For instance, this means that where there are multiple rays in the group of plural rays that should be tested for a given node, all of those rays can be tested in a single testing instance. Correspondingly this then means that the graphics processor is able to load in all of the data for those rays from memory in one go, e.g. in a single memory load operation.

Likewise, the result of the intersection testing can be returned for all of the rays (and for all of the primitives being tested) being tested, and then stored accordingly.

For example, in an embodiment, as mentioned above, the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing acceleration data structure comprising a set of end nodes representing respective subsets of primitives defined for the scene that occupies the volume that the end node corresponds to. In that case, the ray tracing process comprises performing for a plurality of rays a traversal of the ray tracing acceleration data structure to determine which end nodes contain geometry that may be intersected for the rays and then determining, by testing the rays for intersection with the subsets of primitives represented by the end nodes of the acceleration data structure, which, if any, geometry for the scene is intersected by the rays.

Thus, in embodiments, a set of one or more 'ray-primitive' intersection testing instructions that are included in the program is provided for testing rays in the group of rays that are performing the ray tracing operation together for intersection with the subset of primitives that occupies the volume that a given end node of the ray tracing acceleration data structure that is to be tested corresponds to. The set of ray-primitive testing instructions, when executed by execution threads of the group of plural execution threads, thus in an embodiment cause: the graphics processor to test one or more rays from the group of plural rays that are performing the ray tracing operation together for intersection with the primitives in the subset of primitives represented by the end node being tested; and a result of the intersection testing to be returned for the end node for the ray tracing operation.

In that case, when a group of execution threads is executing the program for a corresponding group of rays that are performing a traversal of the ray tracing acceleration data structure together, in response to the execution threads executing the set of one or more ray-primitive testing instructions in respect of an end node of the ray tracing acceleration data structure: the method comprises: testing one or more rays from the group of plural rays that are performing the ray tracing operation together for intersection with the primitives in the subset of primitives represented by the end node being tested; and returning a result of the intersection testing for the end node for the ray tracing operation.

For ease of explanation various embodiments will be described herein wherein the set of primitives being tested correspond to a subset of primitives represented by an end node of a ray tracing acceleration data structure.

However, whilst in embodiments the set of primitives corresponds to a subset of primitives represented by a given end node of a ray tracing acceleration data structure, other arrangements would be possible, and the set of primitives may be any suitably defined set of (in an embodiment plural) primitives defined for the scene. Thus, in embodiments, the set of primitives to be tested may be provided for the ray-primitive intersection testing operation in any suitable and desired manner. For example, in some embodiments, the set of primitives may be all of the primitives defined for the scene, with a group of rays then being tested against all of the primitives (although in an embodiment the set of primitives will be less than all, i.e. a subset, of the primitives defined for the scene).

In this way, by testing rays from a group of rays performing the ray tracing operation together against such sets of primitives, it is possible to reduce the overall number of memory access operations that may be required for testing all of the rays, e.g. at least compared to other possible arrangements where the ray tracing operation including the ray-primitive testing is performed in respect of individual rays, and which arrangements may therefore require a significant number of memory accesses for loading in (and subsequently writing out) the required data for each of the rays for each instance of intersection testing.

This also therefore allows processing resource to be shared for the group of threads that are performing the ray tracing operation together. For instance, and in an embodiment, by having a group of execution threads perform the ray tracing operation for a group of rays together, the ray tracing operation can thus be managed using a single, common data structure (e.g. a 'traversal record') for the group of rays, e.g. that tracks which nodes are associated with geometry that is potentially intersected by the rays in the group of rays (and which nodes/geometry thus needs to be tested (next) for the ray tracing (e.g. traversal) operation).

Again, this can further reduce memory bandwidth since there is in embodiments a single data structure (e.g. a common record of which nodes (geometry) are intersected by rays in the group of rays, which record may generally take any suitable form but is in an embodiment is in the form of a 'stack') that manages the ray tracing operation for the whole group of rays, thus reducing the number of memory accesses, e.g. compared to other possible arrangements wherein respective data structures (e.g. stacks) are provided for the individual rays, e.g. as may be required if the rays are performing the traversal operation independently.

This can also in embodiments facilitate managing the ray tracing operation via local registers, again reducing the need to access external memory. For instance, and in embodiments, the ray tracing operation can be managed via a set of common registers allocated to the execution thread group in which the shared record (the 'traversal' data structure, e.g. stack) for the group of rays is maintained, as will be explained further below.

The approach according to the technology described herein can therefore provide various benefits especially in terms of reducing memory bandwidth.

In the technology described herein, the ray tracing operation that requires the ray-primitive intersection testing to be performed is performed for a group of plural rays together. In particular, the ray tracing operation of the technology described herein is triggered by a suitable shader program that is to be executed by a group of plural execution threads, with individual threads performing the ray tracing operation for respective rays in the group of plural rays. The group of execution threads is in an embodiment kept 'active' as a whole until the ray tracing operation is finished.

To facilitate this, one or more instructions are in an embodiment included in the program that cause the execution threads to be and remain in the active state together, at least until all of the required ray-primitive intersection for the rays in the group of rays that are performing the ray tracing operation together has finished.

This could be achieved in any suitable manner, as desired. For instance, the program instructions may be arranged such that it is ensured that the threads are not caused to diverge, or be terminated, and thus remain in the active state for the ray tracing operation. Or, and in some embodiments, explicit instructions, or instruction modifiers, may be included into the program that when executed force all of the execution threads in the execution thread group to be in the active state (e.g. such that if an execution thread in the execution thread group had terminated, the thread can be brought back into the active state for the ray tracing operation requiring the ray-primitive intersection testing to be performed).

In other words, in the technology described herein, the whole execution thread group for the group of plural rays is in an embodiment kept 'active' such that all of the rays in the group of plural rays effectively perform the ray tracing operation together, as a group, even if it is determined during the ray tracing operation that a given ray in the group of plural rays does not intersect any geometry in the ray tracing acceleration data structure (such that the execution thread processing that ray could in principle be retired/terminated from that point).

In an embodiment, the ray tracing operation requiring the ray-primitive testing is part of an overall traversal operation that includes both the step of traversing the ray tracing acceleration data structure to determine which end nodes represent geometry that is potentially intersected by rays (by performing suitable 'ray-volume' intersection testing) and the step of determining the actual geometry intersection (by performing the 'ray-primitive' intersection testing).

For instance, the ray tracing operation in an embodiment comprises traversing the ray tracing acceleration data structure for the group of rays, and determining, by testing the rays for intersection with the volumes represented by the nodes of the ray tracing acceleration data structure ('ray-volume' intersection testing), which nodes contain geometry that is potentially intersected by the rays. This initial traversal operation is performed down to the individual end nodes, e.g. at the lowest level, of the ray tracing acceleration data structure that represent respective subsets of primitives defined for the scene. As mentioned above, this traversal is in an embodiment performed for a group of rays together.

The result of the initial traversal operation is thus to determine which end nodes represent geometry (i.e. subsets of primitives) that are potentially intersected by a ray, or rays, from the group of rays that perform the traversal operation together. It is then determined which primitives represented by a given end node that was determined to be intersected by a ray are actually intersected by the ray, e.g. by performing the ray-primitive intersection testing of the technology described herein.

In an embodiment these operations are all performed as part of the same traversal operation, and the group of threads that perform the traversal operation for the group of rays are therefore kept active for both the initial traversal (including the ray-volume intersection testing) and for the ray-primitive intersection testing.

Thus, in embodiments, the execution thread group performing the ray tracing (traversal) operation for the group of rays remains active for the whole traversal operation including both the required ray-volume and ray-primitive intersection testing. That is, each of the execution threads (for each of the rays in the group) are in an embodiment arranged to continue executing the program for the ray tracing (traversal) operation (i.e. so that all of the threads in the execution thread group are, and remain, in an 'active' state) until the group of rays as a whole has completed the entire traversal of the ray tracing acceleration data structure including both the determination of which end nodes contain geometry that is potentially intersected and the subsequent determinations of which geometry, if any, is actually intersected by the rays.

The initial traversal operation to determine which end nodes contain geometry that is potentially intersected by a ray may be performed in any suitable fashion, as desired, e.g. depending on the form of the ray tracing acceleration data structure in question.

For instance, as mentioned above, this is in an embodiment triggered as part of the same shader program that requires the ray-primitive intersection testing, as part of an overall ray tracing (traversal) operation. Thus, in an embodiment, the shader program to perform the traversal operation includes one or more 'ray-volume' intersection testing instructions that when executed will cause the graphics processor to test one or more rays in the group of rays performing the traversal operation together for intersection with the volumes (e.g. a set of child volumes) associated with a node that is to be tested during the traversal operation.

Thus, in embodiments, the method further comprises: including in a program to perform a ray tracing acceleration data structure traversal, wherein the program is to be executed by a group of plural execution threads, with individual execution threads in the group of execution threads performing a traversal operation for a respective ray in a corresponding group of rays, a set of one or more instructions that cause the execution threads in the group of execution threads to be in an active state at least until the traversal operation to determine which, if any, geometry for the scene may be intersected by the rays is finished for all of the rays in the group of rays being processed by the group of execution threads, such that the group of rays performs the traversal operation together; and also including in the program a set of one or more 'ray-volume testing' instructions for testing rays for intersection with the one or more volumes associated with a given node of the ray tracing acceleration data structure that is to be tested during the traversal operation, which set of 'ray-volume testing' instructions, when executed by execution threads of the group of plural execution threads, will cause: the graphics processor to test one or more rays from the group of plural rays that are performing the traversal operation together for intersection with the one or more volumes associated with the node being tested; and a result of the intersection testing to be returned for the node for the traversal operation.

When a group of execution threads is executing the program for a corresponding group of rays that are performing a traversal of the ray tracing acceleration data structure together, in response to the execution threads executing the set of one or more 'ray-volume testing' instructions in respect of a node of the ray tracing acceleration data structure: the execution unit will trigger testing one or more rays from the group of plural rays that are performing the traversal operation together for intersection with the one or more volumes associated with the node being tested; and a result of the intersection testing for the node for the traversal operation will be returned.

The ray tracing operation according to the technology described herein is thus in an embodiment a traversal operation that works through the nodes of the ray tracing acceleration data structure, and depending on whether the current node to be tested is an internal node or an end node performs either ray-volume or ray-primitive intersection testing accordingly.

In some embodiments, the ray-primitive testing in respect of a particular end node for one (a first) 'branch' of the ray tracing acceleration data structure may be performed before the traversal operation has fully worked through all of the branches of the tree structure to determine which other, if any, end nodes may be intersected by the rays. For instance, the traversal operation may be performed such that the traversal in an embodiment works down a first branch of the tree structure to determine whether there is any geometry for the branch that is potentially intersected and then proceeds to determine the actual geometry intersections for that branch, before moving to the next (i.e. the adjacent) branch, and so on.

However, other arrangements would be possible, and it is also contemplated, for instance, that the ray tracing operation requiring the ray-primitive testing to be performed may be subsequent, and separate, to the initial traversal operation to determine which of the end nodes represent geometry that is potentially intersected by the rays. In that case, the rays may be re-grouped for the ray-primitive testing (although in an embodiment they are not).

In whichever manner it is performed (when it is performed), the overall effect of the initial traversal operation is to determine which end nodes contain geometry that is potentially intersected by a ray or rays being used for the ray tracing operation. Once it has been determined that an end node contains geometry that is potentially intersected, e.g. by traversing data structure to that end node, the ray-primitive intersection testing can then be (and is) performed to determine the actual geometry intersections (if any).

Moreover, the ray tracing process according to the technology described herein need not use a ray tracing acceleration data structure at all, in which case the ray tracing operation requiring the ray-primitive testing to be performed would not follow a traversal operation at all. In that case, the ray tracing operation may be part of any suitable ray tracing process, and may include any other suitable steps, e.g. for identifying suitable sets of primitives to be tested against a group of rays.

Subject to the requirements of the technology described herein, the ray-primitive intersection testing can be performed in any suitable manner as desired.

In the technology described herein, the ray-primitive intersection testing is performed as part of a ray tracing operation that is performed for a group of rays as a whole. Thus, one or more (and in an embodiment a plurality of) rays in the group of rays can be tested for intersection against each of the primitives in the set of primitives to be tested (e.g. a subset of primitives represented by the end node to be tested). Thus, in an embodiment, the ray-primitive intersection testing involves loading in suitable data defining a set of one or more rays to be tested together with suitable data defining a set (or 'batch') of primitives in respect of which the ray-primitive intersection testing is to be performed.

According to the technology described herein, the inputs to the ray-primitive intersection testing thus in an embodiment comprise:

a set of one or more rays from the group of plural rays that are performing the ray tracing operation together; and a set of (plural) primitives that is to be tested for the group of plural rays that are performing the ray tracing operation together.

As mentioned above, the set of primitives in an embodiment corresponds to a subset of primitives represented by a given end node of the acceleration data structure. Thus, the set of primitives may be identified with reference to their respective node, which may contain suitable pointers to the primitives it represents. However, other arrangements would be possible.

Each ray may be, and in an embodiment is, defined in terms of the origin (originating position (e.g. x, y, z coordinates)) for the ray that is to be tested; the direction of (a direction vector for) the ray that is to traverse the ray tracing acceleration data structure; and the range (distance) that the ray is to traverse (the (minimum and/or maximum) distance the ray is to traverse into the scene).

The set of one or more rays that are input for testing may in some embodiments be the set of all of the rays in the group of plural rays. That is, in some cases, the whole group of rays that is performing the ray tracing operation together is input for testing, and then tested accordingly (regardless of whether the rays actually all need to be tested). However, this may be relatively inefficient. Accordingly, in other embodiments, the set of one or more rays that is input for testing comprises a subset of rays from within the whole group of rays, the subset comprising a subset of rays that are to be tested for the node in question (e.g. since they have been found to potentially intersect one or more volumes associated with the node, e.g. in a previous testing instance during the traversal operation). This can be indicated appropriately, e.g. using a suitable bit 'mask' that identifies which rays in the group of plural rays should be tested against the set of primitives in question.

Thus, an indication of which rays in the group of plural rays should be tested against the set of primitives is in an embodiment also provided as input for the ray-primitive intersection testing. When the ray-primitive testing instruction is executed to trigger testing against a set of primitives (e.g. represented by a given end node), it is thus in an embodiment determined using the indication (e.g. bit mask) which rays in the group of rays performing the ray tracing operation together should be tested against the set of primitives. The desired ray-primitive intersection testing can then be performed for the set of primitives for those rays (and only those rays), and so on, to determine which geometry is intersected by which rays (if any).

In an embodiment the ray-primitive testing is performed in an iterative manner, e.g., and in an embodiment, by selecting a first primitive in the set of primitives to be tested, and then testing (each of) the rays in the set of rays that are being tested against the first primitive to determine which (if any) of the rays intersect the first primitive. Once the ray-primitive testing for the first primitive is finished, the next (a second) primitive is in an embodiment then selected for testing accordingly, and so on, until all of the desired ray-primitive testing has been performed.

Thus, in an embodiment, the primitives in the set of primitives being tested are tested separately, in sequence. However, other arrangements would be possible. In this respect, the technology described herein recognises that in some situations it may not be necessary to test all of the rays against all of the primitives in a given set of primitives.

It may also be the case that it is necessary to terminate the ray-primitive testing early, e.g., where the result of the intersection testing for a (e.g. a first) ray-primitive pair requires further processing by the shader program.

An example of this might be when a ray is determined to intersect a non-opaque primitive, and wherein in response to determining that the ray intersects the non-opaque primitive, this result may then be returned to the shader program to determine whether or not the non-opaque 'hit' should be counted.

Thus, in embodiments, in response to determining that a ray intersects a 'non-opaque' primitive, the result is in an embodiment returned to the shader program, e.g., and in an embodiment, immediately, and the ray-primitive intersection testing operation is thus terminated early (without testing any further primitives in the set of primitives being tested).

In embodiments, the primitives in the set of primitives to be tested are ordered to facilitate this, e.g. such that any non-opaque primitives in a set of primitives to be tested will be tested first.

For example, where a ray tracing acceleration data structure is used, the ray tracing acceleration data structure is in an embodiment configured (and generated) accordingly such that primitives in set of primitives are provided for the ray-primitive testing in an order that facilitates this operation, e.g. such that any non-opaque primitives in a set of primitives to be tested will be tested first. In this way, if the result of the ray-primitive testing for a given primitive may potentially cause the ray-primitive intersection testing operation to finish early (e.g. because the primitive is non-opaque, such that when there is a hit on the (non-opaque) primitive, this needs to be returned to the shader program immediately to check whether or not the hit should be counted), that primitive is in an embodiment tested towards the start of the set of primitives being tested. This can help reduce complexity, e.g., compared to trying to manage or track any such non-opaque hits as part of the ray-primitive intersection testing operation.

Thus, in embodiments, when the set of primitives being tested includes one or more non-opaque primitives these are in an embodiment tested first. Other arrangements and similar rules for ordering the primitives may also be possible.

The actual ray-primitive intersection testing itself, however this is implemented, can be performed in any suitable fashion, as desired, e.g. in the normal fashion for ray tracing processes.

As part of this, it may be desired (e.g., or required) that a ray is determined to only intersect a single primitive defined for the scene (as otherwise this may introduce various artefacts into the final render output). Thus, when the (initial) ray-primitive intersection testing determines that a ray intersects a shared boundary such as an edge or vertex between two or more primitives, a suitable tie-breaking mechanism is in an embodiment used to ensure that the result (i.e. that the ray intersects the primitive) is reported for only one of the primitives. This problem is sometimes referred to as "watertightness".

This could be resolved, e.g., by repeating the ray-primitive intersection testing at higher resolution, e.g. 64×, to try to identify which primitive is actually intersected. However, this may be relatively inefficient especially since the higher resolution is only needed to resolve such edge cases but this solution would necessitate performing all subsequent processing also at the higher resolution.

In the technology described herein, because the primitives are in an embodiment tested in an iterative manner, such that each primitive is tested separately, e.g. without knowledge of the result for other primitives, the tie-breaking scheme should in an embodiment provide a deterministic result that will ensure that the scheme can resolve between two primitives based on the geometry (alone), e.g., and in an embodiment, independently of the order in which the primitives are tested. Thus, in embodiments, the tie-breaking scheme can be (and in an embodiment is) applied in respect of a single primitive in response to determining that the ray intersects an edge of the primitive. The tie-breaking scheme then determines whether the ray falls inside or outside of the primitive based purely on the properties of the ray and the primitive itself.

In embodiments, this is done using a test as follows. Firstly, a perpendicular-ray vector is obtained, e.g. calculated, which perpendicular-ray vector is perpendicular to the direction (vector) of the ray. This can be calculated from the direction of the ray that is loaded in as input for the ray-primitive testing.

An edge vector is then obtained, e.g. calculated, for the edge that is to be tested, i.e. the edge that the ray-primitive intersection testing has determined is intersected by the ray. The edge vector is thus a vector along the direction of the edge. This can be calculated by subtracting the vertices. The edge vector should be determined in the same sense, e.g. by subtracting the vertices in their winding order, e.g. so that the edge vector between the first and second vertices in a primitive defined by three vertices that are ordered first-second-third is determined by subtracting the first vertex from the second vertex. However, so long as the edge vector is determined in a consistent manner other arrangements would be possible.

The scalar (dot) product of these vectors is then obtained, and based on the sign of the scalar (dot) product it is then determined that the ray either falls inside or outside of the primitive. In cases where a ray is determined to intersect a vertex between two edges, this test is in an embodiment performed for both edges defining the vertex, again with the sign of the scalar (dot) product determining whether the ray is determined to fall inside or outside of the primitive. For example, if the scalar (dot) product is positive, the ray may be counted as falling inside the primitive, whereas if the scalar (dot) product is negative, the ray may be counted as falling outside the primitive.

It is believed that this method may be novel and advantageous in its own right. Another embodiment of the technology described herein comprises a method for testing a ray for intersection with a primitive, wherein the primitive is defined in terms of a set of vertices with edges connecting the primitive's vertices, the method comprising:

in response to determining that the ray intersects an edge of the primitive:

determining a perpendicular-ray vector that is perpendicular to the direction of the ray;

determining an edge vector in the direction of the edge that the ray intersects;

determining a dot product of the perpendicular-ray vector and the edge vector; and determining that the ray is either inside or outside the primitive depending on the sign of the dot product.

This tie-break test is in an embodiment performed in response to, and whenever, it is determined from the ray-primitive intersection testing that a ray intersects an edge of a primitive. In the case of a ray intersecting a vertex of a primitive, this test is in an embodiment then performed for each of the two edges defining the vertex, with the signs of both dot products then being used to determine whether the ray is inside or outside the primitive (e.g. if both dot products are positive, the ray is determined to fall inside).

In cases where the scalar (dot) product is exactly zero, a further resolving step may be required. In an embodiment this involves a comparison of one or more data values associated with the two vertices of the primitive defining the edge. For example, the vertices may be represented in terms of three co-ordinates, e.g. with each co-ordinate being represented as a respective data value. A concatenation of the co-ordinates may then be used to generate a characteristic value for the vertex upon which a comparison can be made. It will be appreciated that this comparison has no geometric meaning and any other suitable comparison of the vertices (or other such metric) could be used to resolve such cases.

This approach provides a particularly efficient approach, e.g. that can be readily implemented in hardware.

For instance, by using the perpendicular-ray vector, the testing can be performed from the ray's perspective (in a co-ordinate system where the Z-component of the perpendicular-ray vector is zero), e.g. such that the scalar (dot) product can be performed in two dimensions (only), thus reducing the number of calculations.

However, various other arrangements would be possible. For instance, a similar tie-breaking calculation could be performed using, e.g., the ray direction and a vector that is perpendicular to the edge being tested, except this would require the scalar (dot) product to be calculated in three dimensions.

According to the technology described herein the overall ray tracing operation is performed by the programmable execution unit executing a suitable shader program for the ray tracing operation. In particular, and as explained above, in the technology described herein, the ray tracing operation is performed for a whole group's worth of rays together that are being processed by a corresponding group of execution threads executing the program.

However, rather than the program performing the entire ray tracing operation in the technology described herein, an intersection testing circuit is in an embodiment provided that performs the actual intersection testing between the rays and the primitives represented by the end nodes of the ray tracing acceleration data structure during the traversal. The ray-primitive testing instruction when executed by the execution threads in the execution thread group that is performing the traversal for the group of plural rays, thus in an embodiment causes the graphics processor to message an intersection testing circuit to cause the intersection testing circuit to perform the required testing of one or more of the rays in the group of plural rays.

That is, in embodiments, the overall ray tracing operation is performed by a programmable execution unit of the graphics processor executing a graphics processing program to perform the ray tracing operation. However, in embodiments, when the program requires a ray to be tested against a given end node of the acceleration data structure, as part of the ray tracing operation, the 'ray-primitive intersection testing instruction(s) can be included into the program appropriately, such that when the set of instructions is executed, the execution unit is caused to message the intersection testing circuit and trigger the intersection testing circuit to perform the required intersection testing between the rays and the set of primitives to be tested (e.g. the subsets of primitives represented by the nodes of the acceleration data structure).

In this respect, the technology described herein recognises that as part of the ray tracing operation described above there may still be a need to perform many intersection tests between rays and, e.g., the subsets of primitives represented by the nodes of the acceleration data structure. The technology described herein thus recognises that it may be beneficial to provide a dedicated intersection testing circuit for this purpose that can be called using an appropriate set of one or more 'ray-primitive' intersection testing instructions that can be included into the program that is being executed by the graphics processor.

In other words, rather than, e.g., the programmable execution unit performing the full ray tracing ray intersection determination operation, e.g. including traversing an acceleration data structure to determine geometry that could be intersected by a ray and then determining whether any geometry is actually intersected by the ray, the programmable execution unit offloads some of that processing, and in particular (and at least) the intersection testing between the rays and the sets of primitives provided for testing to the intersection testing circuit.

This then has the effect of performing some of the ray tracing operation (namely the ray-primitive intersection testing operations) using a circuit (hardware) that is dedicated for that purpose (rather than, e.g., performing that operation using more general programmable processing circuitry that is programmed to perform the required operation). This can then lead to accelerated and more efficient intersection testing, as compared, for example, to arrangements in which that is done by executing appropriate programs using a programmable processing circuit (which may be relatively inefficient, e.g. due to poor memory access locality for execution threads corresponding to different rays).

The technology described herein's use of a dedicated instruction that can be included into the program may thus facilitate the use of such intersection testing circuit (hardware). For instance, as explained above, the instruction can be suitably incorporated into the shader program to cause the graphics processor to message the intersection testing circuit as required to perform ray-primitive intersection testing for multiple rays in the group of plural rays in one testing instance. Likewise, grouping rays together for the traversal operation in the manner of the technology described herein means that the intersection testing circuit can load all of the relevant input data for the multiple rays to be tested in one go, thus saving memory bandwidth, as explained above.

The technology described herein therefore particularly facilitates the use of a dedicated circuit (hardware) in this way, to provide an overall, improved (more efficient) traversal operation.

The intersection testing circuit of the graphics processor should be, and is in an embodiment, a (substantially) fixed-function hardware unit (circuit) that is configured to perform the intersection testing according to the technology described herein. The intersection testing circuit should thus comprise an appropriate fixed function circuit or circuits to perform the required operations, although it may comprise and have some limited form of configurability, in use, e.g. if desired.

There may be a single or plural intersection testing circuits, e.g. such that plural programmable execution units share a given (or a single) intersection testing circuit, and/or such that a given programmable execution unit has access to and can communicate with and use plural different intersection testing circuits. Where there are plural intersection testing circuits, each such circuit can in an embodiment operate in the manner of the technology described herein.

The intersection testing circuit (or circuits) should also, and in an embodiment does, have a suitable messaging interface for communicating with the programmable execution unit of the graphics processor as required.

Thus, in the technology described herein, during the ray tracing operation, when the traversal operation requires a ray-primitive testing intersection operation to be performed for one or more rays in the group of plural rays that are performing the traversal together, the programmable execution unit in an embodiment triggers an intersection testing circuit to perform the desired (ray-primitive) intersection testing for the rays in question.

In embodiments, the intersection testing circuit also performs any required ray-volume intersection testing during the traversal operation. In that case, the intersection testing circuit in an embodiment comprises a dedicated ray-volume testing circuit and a dedicated ray-primitive testing circuit that can be called appropriately in response to the shader program executing the relevant instructions. Thus, in embodiments, any and all intersection testing that is required during the traversal operation is offloaded to the intersection testing circuit. However, other arrangements would be possible. For instance, rather than having the intersection testing circuit perform all of the intersection testing, at least some of the intersection testing may be returned to the shader. For example, this may be another way to deal with resolving boundary intersections, or other more complex intersection testing cases. That is, the intersection testing circuit may be dedicated for performing relatively simpler intersection testing (such that it performs the majority of the intersection testing) but for more complex, edge cases, the intersection testing circuit may terminate the intersection testing operation early and return an indication that this has been done to the shader program to trigger the shader program to perform the intersection testing as desired.

As well as the intersection testing circuit, there may also be other accelerators (special purpose units) that are able to communicate with the programmable execution unit, such as a load/store unit (circuit), an arithmetic unit or units (circuit(s)), a texture mapper, etc., if desired.

The communication between the intersection testing circuit(s), etc., and the programmable execution unit can be facilitated as desired. There is in an embodiment an appropriate communication (messaging) network for passing messages between the various units. This communication (messaging) network can operate according to any desired communications protocol and standard, such as using a suitable interconnect/messaging protocol.

When the programmable execution unit requires the intersection testing circuit to perform intersection testing against a given end node of the ray tracing acceleration data structure for one or more rays in the group of plural rays for which the traversal operation is being performed, the programmable execution unit in an embodiment therefore sends a message to that effect to the intersection testing circuit.

The message that is sent from the programmable execution unit to the intersection testing circuit should, and in an embodiment does, contain information that is required to perform the relevant intersection testing operation. Thus it in an embodiment indicates one or more of, and in an embodiment all of the inputs for the ray-primitive intersection testing, e.g. as described below.

At least in the case where the graphics processor includes plural programmable execution units, the message in an embodiment also indicates the sender of the message (i.e. which programmable execution unit has sent the message), so that the result of the ray-primitive intersection testing can be returned to the correct programmable execution unit.

The intersection testing circuit can thus be called to perform intersection testing as desired by the appropriate ray-primitive intersection testing instruction (or set of instructions) being included into the program.

Thus, in embodiments, when a program is generated for causing a group of plural rays to perform a traversal of the ray tracing acceleration data structure together, in the manner described above, when the traversal requires ray-primitive intersection testing to be performed in respect of a node of the ray tracing acceleration data structure, an appropriate set of one or more ray-primitive intersection testing instructions can be included into the program that when executed will cause the programmable execution unit to message the intersection testing circuit to cause the intersection testing circuit to perform the required ray-primitive intersection testing for the node (and to return the output to the programmable execution unit).

However other arrangements would be possible. For instance, rather than messaging hardware to perform the intersection testing, the instruction could cause shader program to jump to a suitable sub-routine to implement the required intersection testing such that the intersection testing is performed by a suitable shader program.

In response to execution unit messaging the intersection testing circuit to perform the ray-primitive intersection testing. the intersection testing circuit thus loads in a set of primitive data defining the primitives for the subset of primitives represented by the end node being tested for testing.

In an embodiment, the intersection testing circuit also performs one or more culling operations such as front/back face and/or opaqueness culling as part of the ray-primitive intersection testing operation. In this respect it will be appreciated that the primitive data that is loaded in for the primitive intersection testing operation will typically already include information such as the distance to the hit primitive and the (e.g.) barycentric co-ordinates of the primitive that can also be used for the front/back face culling. Thus, it may be particularly efficient for the intersection testing circuit to perform such culling as this saves the need to re-compute any such information, which may be relatively expensive, e.g., and especially, if done by the programmable execution unit.

Thus, in embodiments, the intersection testing circuit further performs one or more culling operations using the loaded primitive data, with a result of the culling operations being returned to the execution unit.

Likewise, the tie-breaking scheme described above is in an embodiment also performed by the intersection testing circuit as part of the ray-primitive intersection testing operation, since this scheme facilitates a relatively efficient hardware implementation.

However, various other arrangements would be possible and in general at least some of the processing may be shared in any suitable manner between the shader program and the intersection testing circuit (where this is provided).

In an embodiment the intersection testing circuit thus provides the output of the ray-primitive intersection testing to the shader program to allow the shader program to continue the ray tracing operation accordingly (e.g. by continuing the traversal operation appropriately to determine which other geometry (if any) is intersected, or, once the traversal has finished and all the geometry intersections have been performed, by performing further processing to determine the appearance that the sampling positions should have).

The output of the ray-primitive intersection testing for a given end node is thus an indication (e.g. a list) of which primitives in the subset of primitives represented by the end node are intersected by the (and which of the) rays in the group of plural rays that are performing the ray tracing operation together.

In order to manage the ray tracing (traversal) operation a record is in an embodiment maintained indicating which nodes have been determined to contain geometry that is potentially intersected by rays, and which nodes therefore need to be tested next, and so on. The traversal record thus in an embodiment includes as entries indications of which nodes of the ray tracing acceleration data structure should be tested (i.e. which nodes have volumes for which it has been determined that are intersected by a ray in the group of plural rays performing the traversal operation).

The traversal record may generally take any suitable form, e.g. as may suitable be used for managing such ray tracing traversal operations, but in an embodiment comprises a traversal 'stack'. The traversal record can then be worked through with the record entries being read out (popped) accordingly and provided to the shader program to determine which nodes to be next tested. In the case of a traversal stack, this is in an embodiment managed using a 'last-in-first-out' scheme with the node intersections being pushed to/popped from the stack appropriately. However, various arrangements would be possible in that respect.

In an embodiment the traversal record is shared for the group of rays performing the ray tracing (traversal) operation together. For instance, in the technology described herein the ray tracing operation is performed for a group of plural rays together. This means that the traversal record can be and in an embodiment is managed for the group of plural rays as a whole (in an embodiment using a set of shared, common registers for the corresponding plurality of execution threads processing the rays in the group of rays). This means that there is no need to load/store individual traversal records for each ray.

This can therefore further reduce memory bandwidth requirements, e.g. compared to maintaining a separate record for each ray. For instance, rather than each ray having its own traversal record that is maintained in external memory, and the graphics processor having to always write out the result of the intersection testing for each ray to its respective (per-ray) record in memory, as may otherwise be done, in embodiments of the technology described herein, because the traversal is performed for a group of rays as a whole, the result of the intersection testing for the rays in the group can be (and in an embodiment is) written out to a shared traversal record that is in an embodiment maintained in a set of local registers that have been allocated for the execution thread group that is processing the group of plural rays performing the traversal, such that the traversal record is managed for the whole group of plural rays, e.g. rather than having to repeatedly read in respective records for the individual rays from memory, thus reducing memory bandwidth.

In this way the traversal stack can in an embodiment be managed (entirely) via the registers, in an embodiment on-chip, with the stack only being written out from the registers to memory in the event of overflow.

Thus, in embodiments, the traversal stack is managed, in an embodiment entirely, using the allocated registers for the thread group. In this way, where it is possible to do so, the state of the traversal record can be held entirely locally to the graphics processor, thus reducing memory bandwidth. The size of the data structures can be designed to try to ensure this is the case, at least in normal operation. In that case, the output of the ray-volume intersection testing (i.e. the node (volumes) that are intersected by a ray and therefore need to be tested for the traversal operation) is in an embodiment pushed to the traversal record without being written to memory.

In an embodiment, the output of the intersection testing is only written to memory when writing a result of the intersection testing to the record would cause an overflow of the record. For instance, the traversal record generally has a finite number of entries (e.g., and especially where it is managed using the registers, which typically have a fixed size). For example, in an exemplary embodiment, the traversal record may be 8 entries deep.

Thus, if a particular instance of ray-volume testing results in a large number of intersections, writing a result for each of the determined intersections may cause the traversal record to overflow. In that case, the entire traversal record is in an embodiment copied to the overflow output, e.g. and then written out to memory in its current form. A suitable indicator of the overflow state is then in an embodiment outputted and included into the traversal record, such that the entries that were written out to memory because of the overflow can be loaded back in for testing to allow the entries into the stack. Thus, in the event of a record overflow, the current record is written to memory and then cleared, and an indication that this has happened is included into the record.

For instance, and in an embodiment, the overflow state is also (always) returned as output for the intersection testing. Because the record is in an embodiment written out as a whole, the overflow output will always be either zero or not zero so it is easy to detect when overflow has occurred (e.g. rather than trying to identify which pushes caused overflow, etc.).

In the technology described herein, the traversal record is thus in an embodiment maintained locally via the registers, without necessarily having to access external memory other than in overflow situations.

In embodiments, the traversal record manages the entire ray tracing (traversal) operation including both the ray-volume and ray-primitive intersection testing. The result of the ray-primitive intersection testing is thus in an embodiment returned to the traversal record. Thus, the final state of the traversal record will in an embodiment be a list indicating which primitives are intersected by which rays.

The effect of all of the above is therefore to in an embodiment provide a more efficient ray-primitive testing operation.

The technology described herein relates to the situation where a frame that represents a view of a scene comprising one or more objects is being rendered using a ray tracing process.

In this process, the frame that is being rendered will, and in an embodiment does, comprise an array of sampling positions, and a ray tracing process will be used to render each of the sampling positions so as to provide an output frame (an image) that represents the desired view of the scene (with respective rays that are cast corresponding to and being used when rendering and to render respective sampling positions for the frame).

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process.

In this case, the operation in the manner of the technology described herein may be, and is in an embodiment, used when and for analysing the intersections of the secondary rays with objects in the scene.

The ray-tracing based rendering of a frame that is performed in the technology described herein is triggered and performed by the programmable execution unit of the graphics processor executing a graphics processing program that will cause (and that causes) the programmable execution unit to perform the necessary ray tracing rendering process.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

Thus, the graphics processor (the programmable execution unit of the graphics processor) will operate to execute the shader program(s) that includes a sequence of instructions to perform the desired ray tracing rendering process, for plural, and in an embodiment for each, sampling position, of the frame that is to be rendered.

Correspondingly, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

In a graphics processing system that is operable in the manner of the technology described herein, in embodiments of the technology described herein at least, a compiler, e.g. executing on a host processor, will generate and issue to the graphics processor one or more shader programs that when executed will perform the required ray tracing-based rendering operations in accordance with the technology described herein, with the graphics processor (the programmable execution unit of the graphics processor) then executing the programs to perform the ray tracing-based rendering, and as part of that program execution exchanging the messages discussed above with the ray tracing acceleration data structure traversal circuit of the graphics processor.

The operation of the technology described herein can be (and is) implemented and triggered by including appropriate 'ray-primitive' intersection testing instructions in the ray tracing rendering shader program to be executed by the programmable execution unit that will trigger the desired ray-primitive intersection testing to be performed, e.g., and in embodiments, by triggering the execution unit to send an appropriate message to the intersection testing circuit (with the execution unit then sending the message when it reaches (executes) the relevant instruction in the shader program). (Appropriate instructions for causing the execution threads to be in the active state, and also for performing the ray-primitive testing, at least where this is triggered by the same shader program, can also be included appropriately into the shader program).

Such instructions can be included in a shader program to be executed by the programmable execution unit in any suitable and desired manner and by any suitable and desired element of the overall data (graphics) processing system.

For instance, in an embodiment, the "ray-primitive" intersection testing instruction is included in the shader program by the compiler (the shader compiler) for the graphics processor. Thus the compiler in an embodiment inserts ray-primitive' intersection testing instruction at the appropriate point in the ray tracing rendering shader program that is performing the ray tracing.

In an embodiment, a 'ray-primitive' intersection testing is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a ray-volume intersection testing instruction in respect of a node during the ray tracing operation, with the compiler then, in the technology described herein, including an appropriate 'ray-primitive' intersection testing instruction in the compiled shader program in response to that. It may also be possible for the compiler to ray-primitive' intersection testing instruction of its own accord, e.g. in the case where the compiler is able to assess the shader program being compiled to identify when and where to include a "ray-primitive' intersection testing instruction or instructions, even in the absence of an explicit indication of that.

In an embodiment, the compiler analyses the shader program code that is provided, e.g. by the application on the host processor that requires the graphics processing, and includes a 'ray-primitive' intersection testing instruction or instructions at the appropriate point(s) in the shader program (e.g. by inserting the instruction(s) in the (compiled) shader program).

The technology described herein also extends to and includes such operation of a compiler.

Thus, a further embodiment of the technology described herein comprises a method of compiling a shader program to be executed by a programmable execution unit of a graphics processor that is operable to execute graphics processing programs to perform graphics processing operations;
the method comprising:
including in a shader program to be executed by a programmable execution unit of a graphics processor when rendering a frame that represents a view of a scene comprising one or more objects using a ray tracing process,
wherein the program is to be executed by a group of plural execution threads, with individual execution threads in the group of execution threads performing a ray tracing operation for a respective ray in a corresponding group of rays such that the group of rays performs the ray tracing operation together:
a set of one or more 'ray-primitive' testing instructions for testing rays in the group of rays that are performing the ray tracing operation together for intersection with a set of primitives defined for the scene, which set of 'ray-primitive' testing instructions, when executed by execution threads of the group of plural execution threads, will cause:
the graphics processor to test one or more rays from the group of plural rays that are performing the ray tracing operation together for intersection with the primitives in the set of primitives being tested; and
a result of the intersection testing to be returned for the ray tracing operation.

A further embodiment of the technology described herein comprises a compiler for compiling a shader program to be executed by a programmable execution unit of a graphics processor that is operable to execute graphics processing programs to perform graphics processing operations;
the compiler comprising a processing circuit configured to:
include in a shader program to be executed by a programmable execution unit of a graphics processor when rendering a frame that represents a view of a scene comprising one or more objects using a ray tracing process,
wherein the program is to be executed by a group of plural execution threads, with individual execution threads in the group of execution threads performing a ray tracing operation for a respective ray in a corresponding group of rays such that the group of rays performs the ray tracing operation together:
a set of one or more 'ray-primitive' testing instructions for testing rays in the group of rays that are performing the ray tracing operation together for intersection with a set of primitives defined for the scene, which set of 'ray-primitive' testing instructions, when executed by execution threads of the group of plural execution threads, will cause:
the graphics processor to test one or more rays from the group of plural rays that are performing the ray tracing operation together for intersection with the primitives in the set of primitives being tested; and
a result of the intersection testing to be returned for the ray tracing operation.

As mentioned above, the ray tracing operation in an embodiment comprises traversing a ray tracing acceleration data structure to determine end nodes representing subsets of primitives that are potentially intersected by the rays in the group of rays, and are thus to be tested.

Thus, in embodiments, the method comprises (and the processing circuitry is configured to):
including in a shader program to be executed by a programmable execution unit of a graphics processor when rendering a frame that represents a view of a scene comprising one or more objects using a ray tracing process,
wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing acceleration data structure comprising a set of end nodes representing respective subsets of primitives defined for the scene that occupies the volume that the end node corresponds to;
the ray tracing process comprising performing for a plurality of rays a traversal of the ray tracing acceleration data structure to determine which end nodes contain geometry that may be intersected for the rays and then determining, by testing the rays for intersection with the subsets of primitives represented by the end nodes of the acceleration data structure, which, if any, geometry for the scene is intersected by the rays; and
wherein the program is to be executed by a group of plural execution threads, with individual execution threads in the group of execution threads performing a ray tracing operation for a respective ray in a corresponding group of rays such that the group of rays performs the ray tracing operation together:
a set of one or more 'ray-primitive' testing instructions for testing rays in the group of rays that are performing the ray tracing operation together for intersection with the subset of primitives that occupies the volume that a given end node of the ray tracing acceleration data structure that is to be tested corresponds to, which set of 'ray-primitive' testing instructions, when executed by execution threads of the group of plural execution threads, will cause:

the graphics processor to test one or more rays from the group of plural rays that are performing the ray tracing operation together for intersection with the primitives in the subset of primitives represented by the end node being tested; and a result of the intersection testing to be returned for the end node for the ray tracing operation.

In an embodiment the compiler also includes in the program a set of one or more instructions that cause the execution threads in the group of execution threads to be in an active state at least until the traversal operation to determine which, if any, geometry for the scene may be intersected by the rays is finished for all of the rays in the group of rays being processed by the group of execution threads, such that the group of rays performs the traversal operation together, as described above.

Likewise, the compiler in an embodiment also includes in the program sets of 'ray-volume' intersection testing instructions at appropriate points, e.g. where ray-volume intersection testing is to be performed.

The compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

In this case, the compiler and compiled code will run on separate processors within the overall graphics processing system. However, other arrangements would be possible, such as the compiler running on the same processor as the compiled code, if desired.

The compilation process (the compiler) can generate the ray tracing rendering shader program in any suitable and desired manner, e.g., and in an embodiment, using any suitable and desired compiler techniques for that purpose.

Thus, in an embodiment, the shader program is generated by the compiler, and the compiler is arranged to include within the shader program the instructions that are used in the technology described herein. Other arrangements would, of course, be possible.

The generated shader program can then be issued to the programmable execution unit of the graphics processor for execution thereby.

The technology described herein also extends to the operation of the graphics processor itself when executing the shader program.

Another embodiment of the technology described herein comprises a method of operating a graphics processor when rendering a frame that represents a view of a scene comprising one or more objects using a ray tracing process, the graphics processor comprising a programmable execution unit operable to execute programs to perform graphics processing operations, and in which a program can be executed by groups of plural execution threads together;

the method comprising:

when a group of execution threads is executing a program to perform a ray tracing operation for a corresponding group of rays that are performing a traversal of the ray tracing acceleration data structure together, in response to the execution threads executing a set of one or more ray-primitive testing instructions that are included in the program in respect of a set of primitives defined for the scene:

testing one or more rays from the group of plural rays that are performing the ray tracing operation together for intersection with the primitives in the set of primitives being tested; and returning a result of the intersection testing for the ray tracing operation.

A yet further embodiment of the technology described herein comprises a graphics processor that is operable to render a frame that represents a view of a scene comprising one or more objects using a ray tracing process, the graphics processor comprising:

a programmable execution unit operable to execute programs to perform graphics processing operations, and in which a program can be executed by groups of plural execution threads together;

wherein the execution unit is configured such that, when a group of execution threads is executing a program to perform a ray tracing operation for a corresponding group of rays that are performing a traversal of the ray tracing acceleration data structure together, in response to the execution threads executing a set of one or more 'ray-primitive testing' instructions that are included in the program in respect of a set of primitives defined for the scene:

the execution unit triggers testing of one or more rays from the group of plural rays that are performing the ray tracing operation together for intersection with the primitives in the set of primitives being tested, wherein a result of the intersection testing is then returned for the ray tracing operation.

In embodiments, the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing acceleration data structure comprising a set of end nodes representing respective subsets of primitives defined for the scene that occupies the volume that the end node corresponds to;

the ray tracing process comprising performing for a plurality of rays a traversal of the ray tracing acceleration data structure to determine which end nodes contain geometry that may be intersected for the rays and then determining, by testing the rays for intersection with the subsets of primitives represented by the end nodes of the acceleration data structure, which, if any, geometry for the scene is intersected by the rays.

Thus, the method in an embodiment comprises (and the graphics processor is configured such that):

when a group of execution threads is executing a program to perform a ray tracing operation for a corresponding group of rays that are performing a traversal of the ray tracing acceleration data structure together, in response to the execution threads executing a set of one or more 'ray-primitive testing' instructions that are included in the program in respect of an end node of the ray tracing acceleration data structure:

testing one or more rays from the group of plural rays that are performing the ray tracing operation together for intersection with the primitives in the subset of primitives represented by the end node being tested; and returning a result of the intersection testing for the end node for the ray tracing operation.

However, other arrangements would be possible. As will be appreciated by those skilled in the art, these additional embodiments of the technology described herein relating to the operation of the compiler and/or the graphics processor can, and in an embodiment do, include any one or more or all of the features of the technology described herein described herein, as appropriate.

When executing the shader program to perform the ray tracing based rendering process, as it is a ray tracing-based rendering process, the performance of that process will include the tracing of rays into and through the scene being rendered, e.g., and in an embodiment, so as to determine how a given sampling position that the ray or rays in question correspond to should be rendered to display the required view of the scene at that sampling position.

The graphics processor can be any suitable and desired graphics processor that includes a programmable execution unit (circuit) that can execute program instructions.

The programmable execution unit can be any suitable and desired programmable execution unit (circuit) that a graphics processor may contain. It should be operable to execute graphics shading programs to perform graphics processing operations. Thus the programmable execution unit will receive graphics threads to be executed, and execute appropriate graphics shading programs for those threads to generate the desired graphics output.

Once a thread has finished its respective processing operation, the thread can then be 'retired', e.g. and a new execution thread spawned in its place.

The graphics processor may comprise a single programmable execution unit, or may have plural execution units. Where there are a plural execution units, each execution unit can, and in an embodiment does, operate in the manner of the technology described herein. Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

According to the technology described herein the graphics processor and the programmable execution unit are operable to execute shader programs for groups ("warps") of plural execution threads together, e.g. in lockstep, e.g., one instruction at a time. In that case, the execution threads in the execution thread group in an embodiment perform the same traversal operation, but for different rays, e.g., and in an embodiment, in a single instruction, multiple data (SIMD) execution state.

The groups of execution threads can therefore (and do) each process a corresponding group of plural of rays for the ray tracing operation. According to the technology described herein, the graphics processor is thus configured to, and operable to, group rays (traversal requests) that are to perform the ray tracing (traversal) operation together.

The grouping may be performed in any suitable fashion as desired, but in an embodiment rays that are sufficiently similar to each other and that are to perform the same ray tracing (traversal) operation are grouped together. This will help to increase memory locality, and, accordingly, improve the effectiveness of any caching of the ray tracing acceleration data structure (and correspondingly reduce the number of off-chip memory accesses that may be required).

In this case, the rays are in an embodiment grouped together based on their similarities to each other, such that "similar" rays will be grouped together for this purpose. Thus rays are in an embodiment grouped for performing the (same) ray tracing (traversal) operation together based on one or more particular, in an embodiment selected, in an embodiment predefined criteria, such as one or more of, and in an embodiment all of: the starting positions (origins) for the rays; the directions (direction vectors) of the rays; and the range that the rays are to be cast for.

Thus, in an embodiment, rays can be, and are, grouped together for the ray tracing (traversal) operation if and when their positions (origins), directions, and/or ranges, are sufficiently similar (e.g., and in an embodiment, are within a particular threshold range or margin of each other) (and the rays are to traverse the same ray tracing acceleration data structure). This will then facilitate performing the ray tracing (traversal) operation for similar rays together, thereby increasing memory access locality, etc., and thus making the ray tracing operation more efficient.

In order to facilitate this operation, the graphics processor can in an embodiment maintain a "pool" of rays that are waiting to perform a ray tracing (traversal) operation (e.g. in an appropriate queue or buffer (cache) on or accessible to the graphics processor), and select groups of one or more rays from that pool for processing, e.g., and in an embodiment, based on one or more or all of the criteria discussed above. A suitable execution thread group may then be spawned for the selected group of rays, and a program executed to cause the group of rays to perform the operation together. This will then facilitate processing groups of similar rays together.

The graphics processor correspondingly in an embodiment comprises an appropriate controller operable to select and group rays for which ray tracing (traversal) operations are to be performed from the "pool", and to cause ray tracing (traversal) operations to be performed for groups of rays together.

In this case, rays that are in the "pool" and that are waiting to perform the ray tracing (traversal) operation in an embodiment have their duration in the pool (their "ages") tracked, with any ray whose duration in the pool exceeds a particular, in an embodiment selected, in an embodiment predetermined, threshold duration ("age"), then being prioritised for processing, e.g., and in an embodiment, without waiting any further for later, "similar" rays to arrive for processing. This will then help to ensure that rays are not retained in the pool for too long whilst waiting for other rays potentially to group with the ray.

The rays in the pool may, for example, be time-stamped for this purpose so that their ages in the pool can be tracked. Other arrangements would, of course, be possible. Once a group of rays to be processed together have been selected, then the rays should be processed together as a group, e.g. by spawning a suitable execution thread group, and causing the execution thread group to execute a program to perform the ray tracing (traversal) operation.

The groups of rays for which the ray tracing (traversal) operations are performed together can comprise any suitable and desired (plural) number of rays, although there may, e.g., and in an embodiment, be a particular, in an embodiment selected, in an embodiment defined, maximum number of rays for which the ray tracing (traversal) operation may be performed together, e.g. depending upon the parallel processing capability of the intersection testing circuit (where this is provided).

Other arrangements would, of course, be possible. Thus, in the technology described herein, the group of one or more execution threads comprises plural execution threads, and corresponds to a thread group (warp) that is executing the program, e.g. in lockstep. In an embodiment, the group of execution threads comprises more than two execution threads, such as four, eight or sixteen (or more, such as 32, 64 or 128) execution threads.

The ray tracing operation according to the technology described herein is performed using a ray tracing acceleration data structure. The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure in an embodiment represents (a plurality of) respective volumes within the scene being rendered and indicates and/or can be used to determine geometry for the scene to be rendered that is present in those volumes.

The ray tracing acceleration data structure(s) can take any suitable and desired form. In an embodiment the ray tracing acceleration data structure(s) comprise a tree structure, such as a bounding volume hierarchy (BVH) tree. The bounding volumes may be axis aligned (cuboid) volumes. Thus, in one embodiment, the ray tracing acceleration data structure comprises a bounding volume hierarchy, and in an embodiment a BVH tree.

The BVH is a tree structure with primitives (which may be triangles, or other suitable geometric objects) at the leaf nodes. The primitives at the leaf nodes are wrapped in bounding volumes. In an embodiment the bounding volumes are axis aligned bounding boxes. The bounding volumes are then recursively clustered and wrapped in bounding volumes until a single root node is reached. At each level of the recursion two or more bounding volumes may be clustered into a single parent bounding volume. For instance, and in an embodiment, each non-leaf node has a corresponding plurality of child nodes.

In an embodiment the ray tracing acceleration data structure used in the technology described herein comprises a 'wide' tree structure, in which each parent node may be (and in an embodiment is) associated with greater than two child nodes, such as three, four, five, six, or more, child nodes. In an embodiments each parent node may be associated with up to six child nodes. In that case, each instance of ray-volume intersection testing in an embodiment comprises testing one or more rays in the group of plural rays against each of the plural child nodes.

However, other suitable ray tracing acceleration data structures may also be used, as desired. For instance, rather than using a BVH hierarchy, where the scene is subdivided by volume on a per-object basis, e.g. by drawing suitable bounding volumes around subsets of geometry, e.g., and in an embodiment, such that each leaf node (volume) corresponds to a certain number of objects (primitives), the scene could instead be subdivided on a per-volume basis, e.g. into substantially equally sized sub-volumes. For example, the ray tracing acceleration data structure may comprise a k-d tree structure, a voxel (grid hierarchy), etc., as desired. It would also be possible to use 'hybrid' ray tracing acceleration data structures where the scene is subdivided in part on a per-object basis and in part on a per-volume basis. Various other arrangements would be possible and the technology described herein may in general be used with any suitable ray tracing acceleration data structure.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered.

It could also or instead be generated by a CPU (e.g. host processor), e.g. based on an indication of geometry for the scene, e.g. in a preliminary processing pass before the scene is rendered.

Other arrangements would, of course, be possible. The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to. Additionally or alternatively, the ray tracing acceleration data structure could represent the geometry for the scene in the form of higher level representations (descriptions) of the geometry, for example in terms of models or objects comprising plural primitives.

It would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays.

Other arrangements would, of course, be possible. The traversal operation can traverse the ray tracing acceleration data structure(s) for a ray in any suitable and desired manner, e.g., and in an embodiment in dependence upon the form of the ray tracing acceleration data structure that is being traversed. The traversal operation will use the information provided about the ray to traverse the ray tracing acceleration data structure to determine geometry for the scene to be rendered that may be intersected by the ray in question.

Thus, the traversal process in an embodiment operates to traverse the ray tracing acceleration data structure to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In particular, the traversal process involves, for a ray (in the group of plural rays for which the traversal is being performed) that is being used for the ray tracing process, testing the ray for intersection with one or more (child node) volumes associated with a node of the ray tracing acceleration data structure to determine which of the associated volumes (i.e. child nodes) is intersected by the ray. The traversal process then comprises subsequently testing the ray for intersection with the volumes associated with the (child) node in the next level of the ray tracing acceleration data structure, and so on, down to the lowest level (leaf) nodes. Once the traversal process has worked through the ray tracing acceleration data structure, by performing the required ray-volume intersection testing for the nodes to determine which volumes (represented by end/leaf nodes) contain geometry that may be intersected by the ray, the ray can then be further tested to determine the actual (ray-primitive) intersections with the geometry defined within those volumes (and only within those volumes) (with any intersected geometry then being shaded appropriately).

Subject to the requirements of the technology described herein the traversal can be performed in any suitable fashion, as desired.

In an embodiment, the traversal operation traverses the ray tracing acceleration data structure for the path of the ray until a first (potential) intersection with geometry defined for the scene is found for the ray. However, it would also be possible to continue traversal of the ray tracing acceleration data structure after a first (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially) intersected geometry is fully or partially transparent, it may be desirable to continue with the traversal (and either discard or retain the initial "transparent" intersection).

Other arrangements would, of course, be possible. The ray tracing acceleration data structure traversal for a ray could comprise traversing a single ray tracing acceleration data structure for the ray, or traversing plural ray tracing acceleration data structures for the ray. Thus, in an embodiment the ray tracing acceleration data structure traversal operation for a ray comprises traversing plural ray tracing acceleration data structures for the ray, to thereby determine geometry for the scene to be rendered that may be intersected by the ray.

Plural ray tracing acceleration data structures may be traversed for a ray e.g. in the case where the overall volume of, and/or geometry for, the scene is represented by plural different ray tracing acceleration data structures.

Similarly, as discussed above, in one embodiment, a ray tracing acceleration data structure that indicates further ray tracing acceleration data structures to be traversed is used. In this case therefore the ray tracing acceleration data structure traversal circuit will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

The effect of the ray-primitive intersection testing described above is thus to determine which geometry is intersected by the rays that are being used for the ray tracing process.

The determination of which geometry is intersected by the rays is then used by graphics processor to continue the processing (ray tracing/rendering) operations.

For instance, the operations described above can then be (and are) repeated for other groups of rays for the sampling position, and once this is done, the sampling position can then be rendered accordingly, e.g. in the usual way for ray tracing operations.

For any geometry (primitives) that is it determined is actually intersected by a ray, various processing steps can then be taken to determine the effect (e.g. appearance) this should have in the sampling position for which the ray was cast.

Thus, once the geometry that the rays will actually intersect (if any) has been determined, then the programmable execution unit performs further processing for the sampling positions in the frame that the rays correspond to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible. In the case that the ray tracing (traversal) operation finds that the ray does not traverse any volume that contains defined geometry for the scene, or does not intersect any geometry, then the graphics processor in an embodiment returns an appropriate response in that event. In an embodiment, the ray tracing (traversal) operation returns a response indicating that nothing has been intersected by the ray (that no potential intersection has been found) (i.e. that there has been a "miss").

In an embodiment, in response to such a "miss" response from the ray tracing operation, the programmable execution unit performs an appropriate particular, in an embodiment selected, in an embodiment predefined, "default" operation for further processing for the sampling position in question in response to that event. This could comprise, for example, assuming intersection with a bounding volume or skybox or computing a procedural colour for the background, etc. Various other arrangements would be possible in this regard. The programmable execution unit will then shade the sampling position accordingly.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Thus, in an embodiment, the further processing for a sampling position in a frame that a ray corresponds to that is performed comprises one of:

triggering the tracing (casting) of a further (e.g. secondary) ray for the sampling position in question; and rendering (shading) the sampling position so as to provide an output colour value for the sampling position for the frame.

Correspondingly, the technology described herein in an embodiment comprises shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible. In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

In order to perform any required subsequent processing, the programmable execution unit may, and in an embodiment does, use further information relating to the geometry (e.g. primitives), such as appropriate attributes of the geometry (e.g. primitives), such as their vertex positions, normals, surface type/materials), etc. This may be needed for performing further processing in relation to the sampling position accordingly.

Thus the process in an embodiment uses information regarding the properties of the geometry (e.g. in terms of its surface properties, the surface it belongs to, etc.). This information can be provided in any suitable and desired manner, but in an embodiment indexes/pointers to data structures where the data relating to the properties of the geometry is stored are used.

In an embodiment, these properties (additional attributes) are fetched by the programmable execution unit as appropriate, once an intersection determination has been returned by the ray tracing acceleration data structure traversal operation (e.g. by, as discussed below, executing further program instructions to fetch the required attributes).

It would also or instead be possible, if desired, for the indication of the geometry for the scene to be rendered that may be intersected by the ray that is returned to the programmable execution unit by the ray tracing acceleration data structure traversal operation to, as well as indicating the geometry itself, convey and/or indicate such information regarding the properties of the geometry, e.g. in the form of indexes/pointers to data structure(s) where data relating to the properties of the geometry is stored.

In an embodiment, the ray tracing rendering process supports the use of plural different geometry models, e.g., and in an embodiment, in dependence of the distance of the geometry from the viewpoint (camera), and/or from any lighting for the scene, etc., and the ray tracing acceleration data structure traversal operation returns with the indicated geometry an indication of which one of the different models should be used for the geometry.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

The technology described herein also extends to an overall graphics processing system and the operation of that system.

Thus, another embodiment of the technology described herein comprises a method of operating a graphics processing system, the graphics processing system including:
a graphics processor comprising:
a programmable execution unit operable to execute programs to perform graphics processing operations, and in which a program can be executed by groups of plural execution threads together;
the method comprising:
generating a graphics shader program or programs which, when executed by the programmable execution unit of the graphics processor, causes the graphics processor to render a frame that represents a view of a scene comprising one or more objects using a ray tracing process,
the generating a graphics shader program or programs which, when executed by the programmable execution unit of the graphics processor, causes the graphics processor to render a frame that represents a view of a scene comprising one or more objects using a ray tracing process comprising:
including in a program to perform a ray tracing operation, wherein the program is to be executed by a group of plural execution threads, with individual execution threads in the group of execution threads performing a ray tracing operation for a respective ray in a corresponding group of rays such that the group of rays performs the ray tracing operation together, a set of one or more 'ray-primitive' testing instructions for testing rays in the group of rays that are performing the ray tracing operation together for intersection with a set of primitives defined for the scene, which set of 'ray-primitive' testing instructions, when executed by execution threads of the group of plural execution threads, will cause:
the graphics processor to test one or more rays from the group of plural rays that are performing the ray tracing operation together for intersection with the primitives in the set of primitives being tested; and
a result of the intersection testing to be returned for the ray tracing operation;
the method further comprising:
providing the generated graphics shader program or programs to the graphics processor for execution by the programmable execution unit; and
the programmable execution unit of the graphics processor:
executing the graphics shader program or programs to render a frame that represents a view of a scene comprising one or more objects using a ray tracing process; and
when a group of execution threads is executing the program for a corresponding group of rays that are performing a traversal of the ray tracing acceleration data structure together, in response to the execution threads executing the set of one or more 'ray-primitive testing' instructions in respect of a set of primitives:
testing one or more rays from the group of plural rays that are performing the ray tracing operation together for intersection with the primitives in the set of primitives being tested; and
returning a result of the intersection testing for the ray tracing operation.

Another embodiment of the technology described herein comprises a graphics processing system, the graphics processing system comprising:
a graphics processor comprising:
a programmable execution unit operable to execute programs to perform graphics processing operations, and in which a program can be executed by plural execution threads at the same time;
the graphics processing system further comprising:
a processing circuit configured to:
generate a graphics shader program or programs which, when executed by the programmable execution unit of the graphics processor, causes the graphics processor to render a frame that represents a view of a scene comprising one or more objects using a ray tracing process;
the generating a graphics shader program or programs which, when executed by the programmable execution unit of the graphics processor, causes the graphics processor to render a frame that represents a view of a scene comprising one or more objects using a ray tracing process comprising:
including in a program to perform a ray tracing operation, wherein the program is to be executed by a group of plural execution threads, with individual execution threads in the group of execution threads performing a ray tracing operation for a respective ray in a corresponding group of rays such that the group of rays performs the ray tracing operation together, a set of one or more 'ray-primitive' testing instructions for testing rays in the group of rays that are performing the ray tracing operation together for intersection with a set of primitives defined for the scene, which set of 'ray-primitive' testing instructions, when executed by execution threads of the group of plural execution threads, will cause:

the graphics processor to test one or more rays from the group of plural rays that are performing the ray tracing operation together for intersection with the primitives in the set of primitives being tested; and a result of the intersection testing to be returned for the ray tracing operation;

the processing circuit being further configured to:

provide the generated graphics shader program or programs to the graphics processor for execution by the programmable execution unit; and the programmable execution unit of the graphics processor being configured to:

execute the graphics shader program or programs to render a frame that represents a view of a scene comprising one or more objects using a ray tracing process; and when a group of execution threads is executing the program for a corresponding group of rays that are performing a traversal of the ray tracing acceleration data structure together, in response to the execution threads executing the set of one or more 'ray-primitive testing' instructions in respect of a set of primitives:

the execution unit triggers testing of one or more rays from the group of plural rays that are performing the ray tracing operation together for intersection with the primitives in the set of primitives being tested, wherein a result of the intersection testing for the ray tracing operation is then returned.

As will be appreciated by those skilled in the art, these embodiments of the technology described herein can, and in an embodiment do, include any one or more or all of the features of the technology described herein described herein.

For instance, as mentioned above, the ray tracing process in an embodiment uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing acceleration data structure comprising a set of end nodes representing respective subsets of primitives defined for the scene that occupies the volume that the end node corresponds to; the ray tracing process comprising performing for a plurality of rays a traversal of the ray tracing acceleration data structure to determine which end nodes contain geometry that may be intersected for the rays and then determining, by testing the rays for intersection with the subsets of primitives represented by the end nodes of the acceleration data structure, which, if any, geometry for the scene is intersected by the rays. Thus, in embodiments, the set(s) of primitives to be tested correspond to respective subsets of primitives represented by end nodes of the ray tracing acceleration data structure.

Thus, for example, the shader program or programs that are provided to the graphics processor for execution (and that are prepared by the compiler) in an embodiment comprise a first sequence of instructions to perform appropriate graphics processing operations for a ray tracing-based rendering process up to and including the traversal operation, together with one or more sequences of instructions to be executed once a response from the traversal operation has been received (and, in an embodiment, to be executed in dependence upon the response from the ray tracing acceleration data structure, such as the geometry/surface type), which sequences of instructions will, when executed, determine any geometry that is intersected by a ray using the determined indication of the geometry returned by the ray tracing acceleration data structure traversal, and then trigger further processing in respect of a sampling position that the ray corresponds to accordingly (which further processing in an embodiment may be the casting of a further ray, and/or the rendering (shading) of the sampling position that the ray corresponds to).

Other arrangements would, of course, be possible. It will be appreciated by those skilled in the art that all of the described embodiments of the technology described herein can, and in an embodiment do, include, as appropriate, any one or more or all of the features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, and units, of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described by way of example only and with reference to the accompanying drawings.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
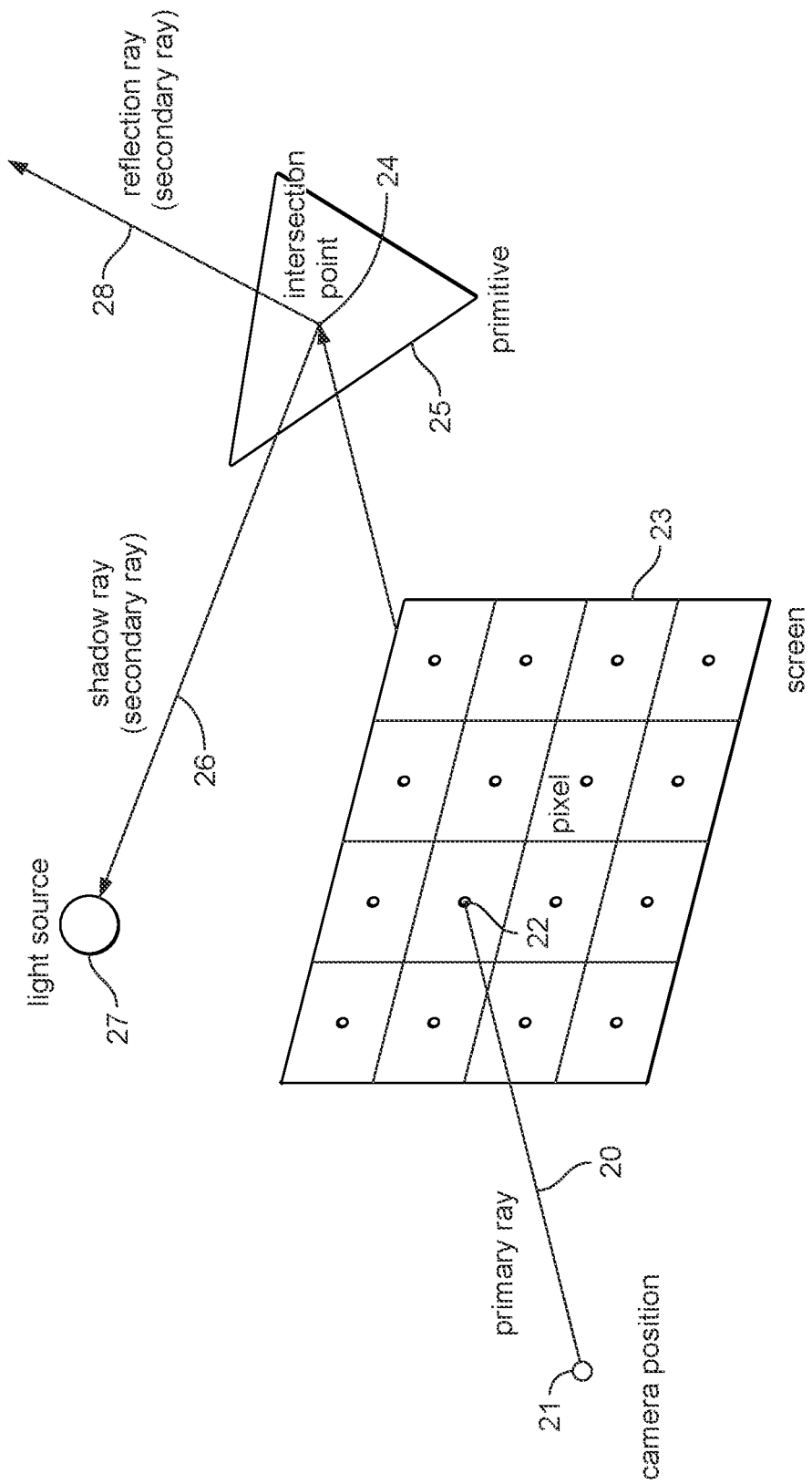
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-)volumes in the overall volume of the scene (that is being considered). In the present embodiments, ray tracing acceleration data structures in the form of Bounding Volume Hierarchy (BVH) trees are used.

Figure 3:
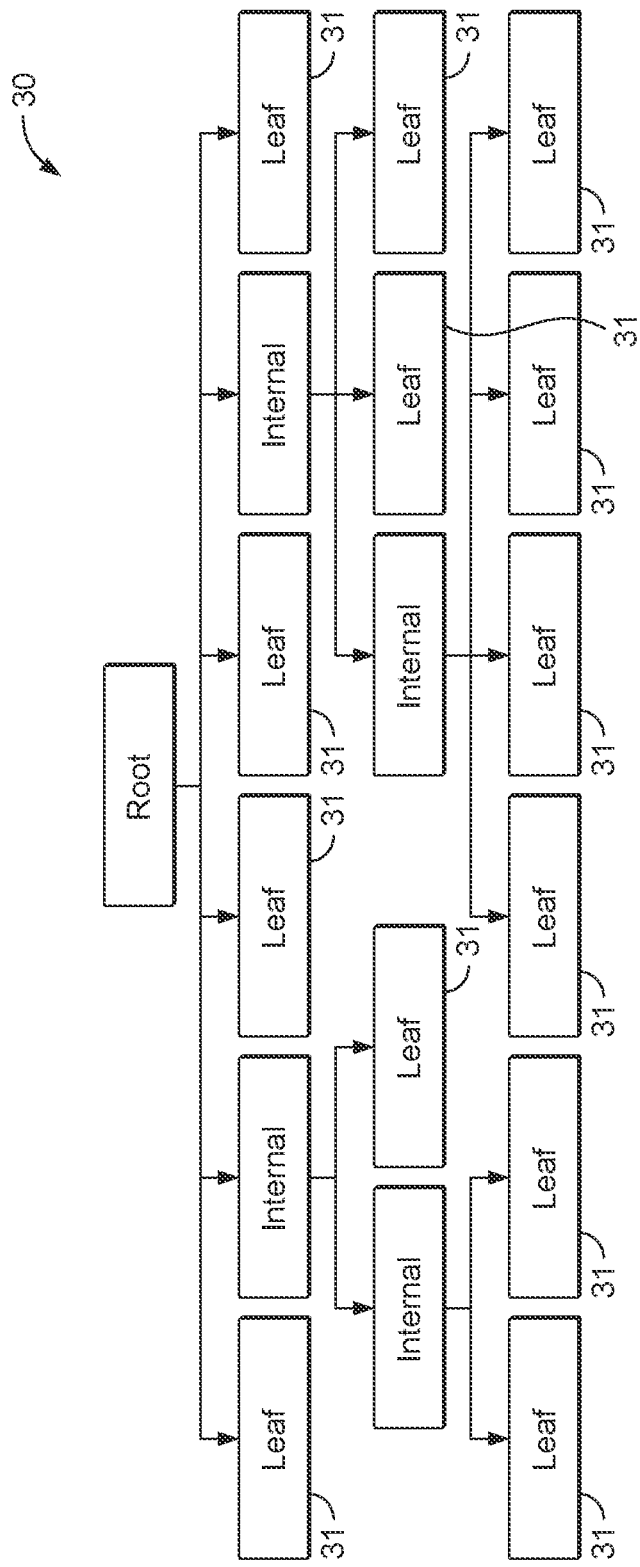
FIG. 3 shows an exemplary ray tracing acceleration data structure.

FIG. 3 shows an exemplary BVH tree 30, constructed by enclosing the complete scene in an axis-aligned bounding volume (AABV), e.g. a cube, and then recursively subdividing the bounding volume into successive sub-AABVs according to any suitable and desired, and, e.g. various, subdivision schemes (e.g. same number of objects per child, based on traversal cost, etc.), until a desired smallest subdivision (volume) is reached.

In this example, the BVH tree 30 is a wide tree wherein each bounding volume is subdivided into up to six sub-AABVs. However, in general, any other suitable tree structure may be used, and a given node of the tree may have any suitable and desired number of child nodes.

Thus, each node in the BVH tree 30 will have a respective volume of the scene being rendered associated with it, with the end, leaf nodes 31 each representing a particular, non-overlapping, smallest subdivided volume of the scene, and any parent node representing, and being associated with, the volume of its child nodes. Each leaf node will also correspondingly be associated with the geometry defined for the scene that falls, at least in part, within the volume that the leaf node corresponds to (e.g. whose centroid falls within the volume in question). The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Figure 4:
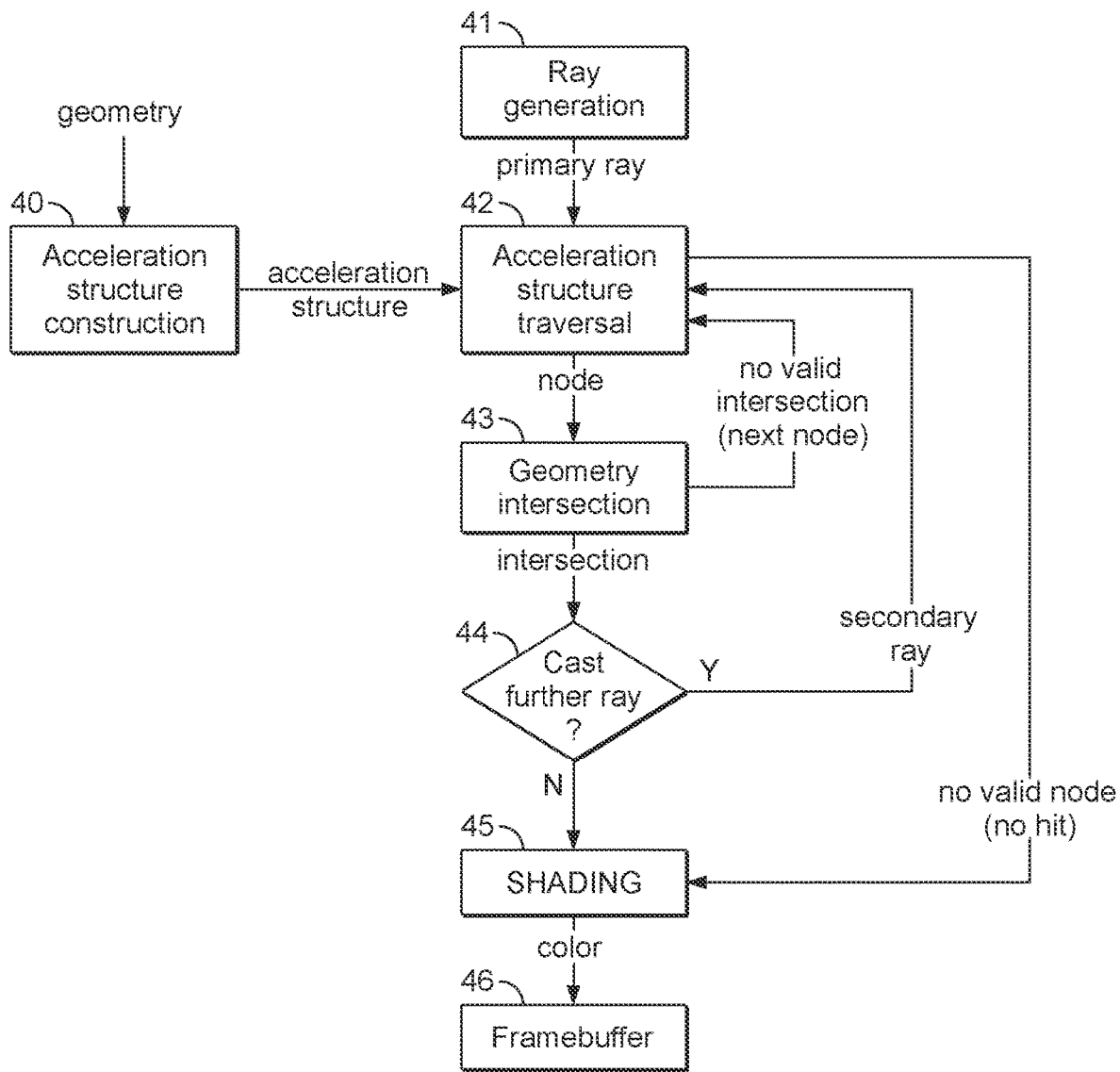
FIG. 4 is a flow chart illustrating an embodiment of a full ray tracing process.

FIG. 4 is a flow chart showing the overall ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified.

When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 4, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 5:
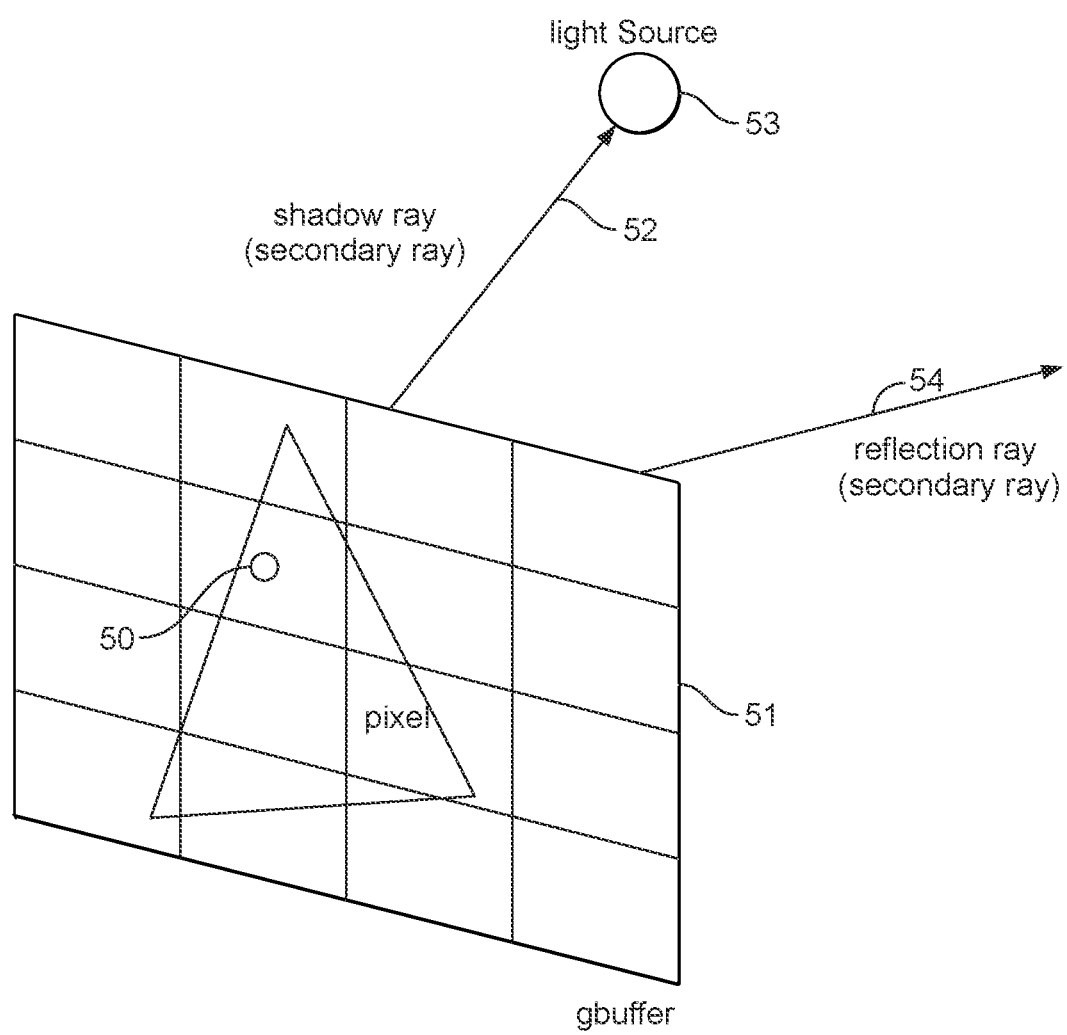
FIG. 5 is a schematic diagram illustrating a "hybrid" ray tracing process.

FIG. 5 shows an alternative ray tracing process which may be used in embodiments of the technology described herein, in which only some of the steps of the full ray tracing process described in relation to FIGS. 3 and 4 are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above with reference to FIGS. 2-4, and in particular to the ray tracing acceleration data structure traversal and geometry intersection (steps 42-43 in FIG. 4) performed as part of the ray tracing operation.

Figure 6:
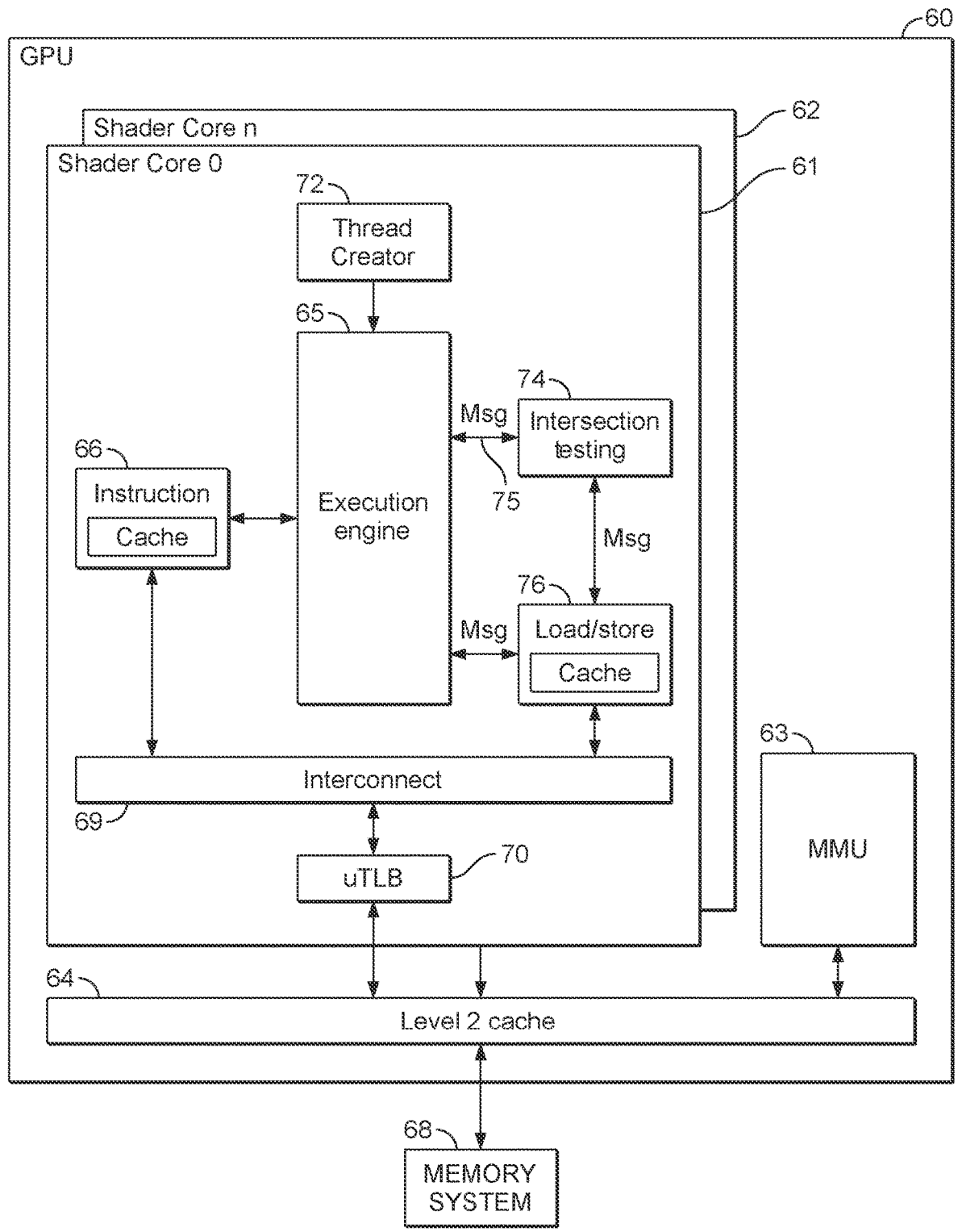
FIG. 6 shows schematically an embodiment of a graphics processor that can be operated in the manner of the technology described herein.

FIG. 6 shows schematically the relevant elements and components of a graphics processor (GPU) 60 of the present embodiments.

As shown in FIG. 6, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).)

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 6, the shader core 61 further comprises a f thread creator (generator) 72 operable to generate execution threads for execution by the programmable execution unit 65.

As shown in FIG. 6, the shader core 61 also includes an intersection testing circuit 74, which is in communication with the programmable execution unit 65, and which is operable to perform the required ray-volume testing during the ray tracing acceleration data structure traversals (i.e. the operation of step 42 of FIG. 4) for rays being processed as part of a ray tracing-based rendering process, in response to messages 75 received from the programmable execution unit 65.

In the present embodiments the intersection testing circuit 74 is also operable to perform the required ray-primitive testing (i.e. the operation of step 43 of FIG. 4). The intersection testing circuit 74 is also able to communicate with the load/store unit 76 for loading in the required data for such intersection testing.

In the present embodiments, the intersection testing circuit 74 of the graphics processor is a (substantially) fixed-function hardware unit (circuit) that is configured to perform the required ray-volume and ray-primitive intersection testing during a traversal of a ray tracing acceleration data structure to determine geometry for a scene to be rendered that may be (and is) intersected by a ray being used for a ray tracing operation.

Figure 7:
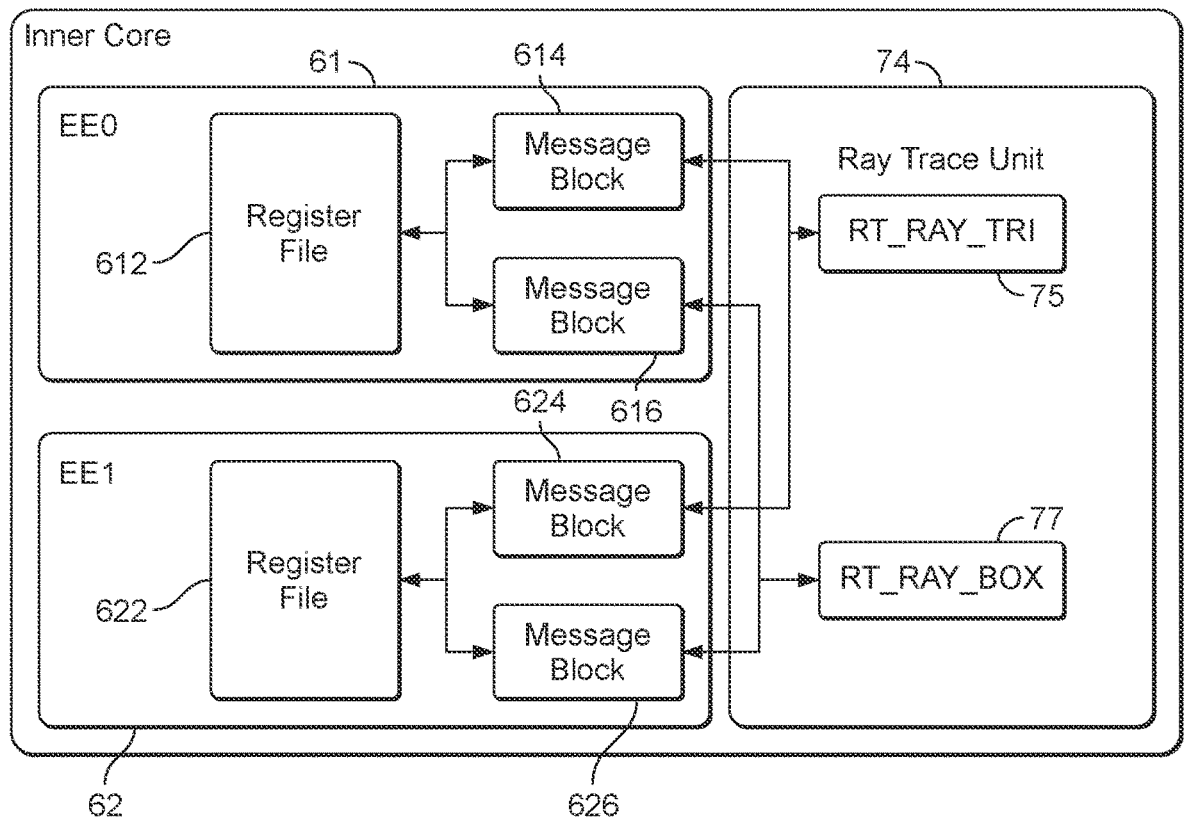
FIG. 7 shows schematically in more detail elements of a graphics processor that can be operated in the manner of the technology described herein.

FIG. 7 shows in more detail the communication between the intersection testing circuit 74 and the shader cores 61, 62. As shown in FIG. 7, in the present embodiments, the intersection testing circuit 74 includes respective hardware circuits for performing the ray-volume testing (RT_RAY_BOX) 77 and for performing the ray-primitive testing (RT-RAY-TRI) 75. The shader cores 61, 62 thus contain appropriate message blocks 614, 616, 624, 626 for messaging the respective ray-volume testing circuit 77 and ray-primitive testing circuit 75 accordingly when it is desired to perform intersection testing during a traversal operation.

As also shown in FIG. 7, these message blocks communicate with respective register files 612, 622 of the shader cores 61, 62 so that the result of the intersection testing can be written to the register files. In particular, in the present embodiments the traversal operation is managed using a traversal stack that is maintained in a set of shared register files for a group of plural execution threads (a warp) processing rays that are performing the traversal operation.

Figure 8:
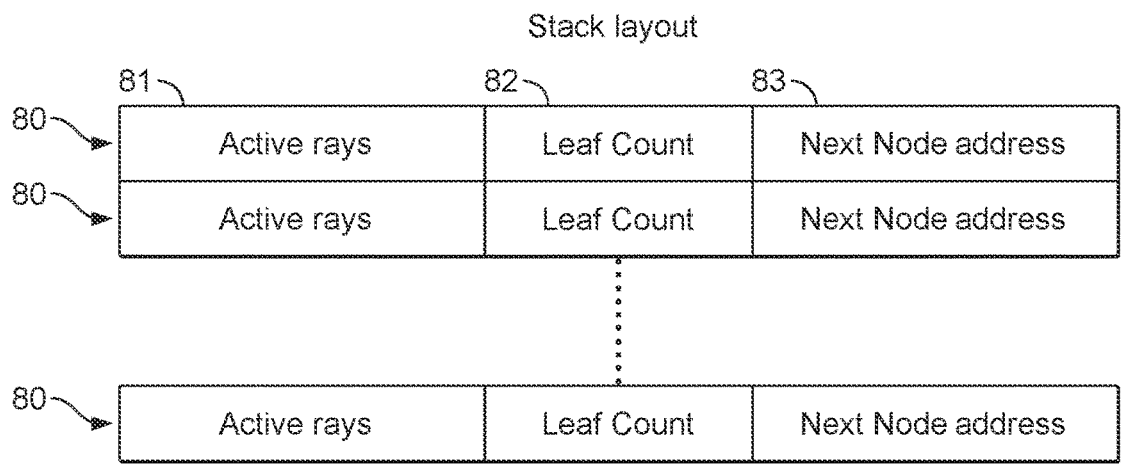
FIG. 8 shows schematically a stack layout that may be used for managing a ray tracing traversal operation.

FIG. 8 shows the stack layout in the present embodiments. As shown in FIG. 8, the traversal stack includes a list of entries 80. Each entry is associated with an indication of the next node address to be tested, e.g. in the form of a suitable pointer to the next node address 83. The leaf count 82 field is used to track whether the node corresponds to a leaf node or an internal node and hence whether to trigger ray-volume or ray-primitive testing. Another field 81 is provided that indicates which rays in the group of rays performing the traversal together should be tested for the node in question.

As mentioned above, the traversal stack is in the present embodiments managed for the group of rays as a whole, via a set of shared registers allocated for the execution threads processing the rays. This can therefore help reduce memory bandwidth since the traversal stack can be managed for the group as a whole locally to the graphics processor.

Figure 9:
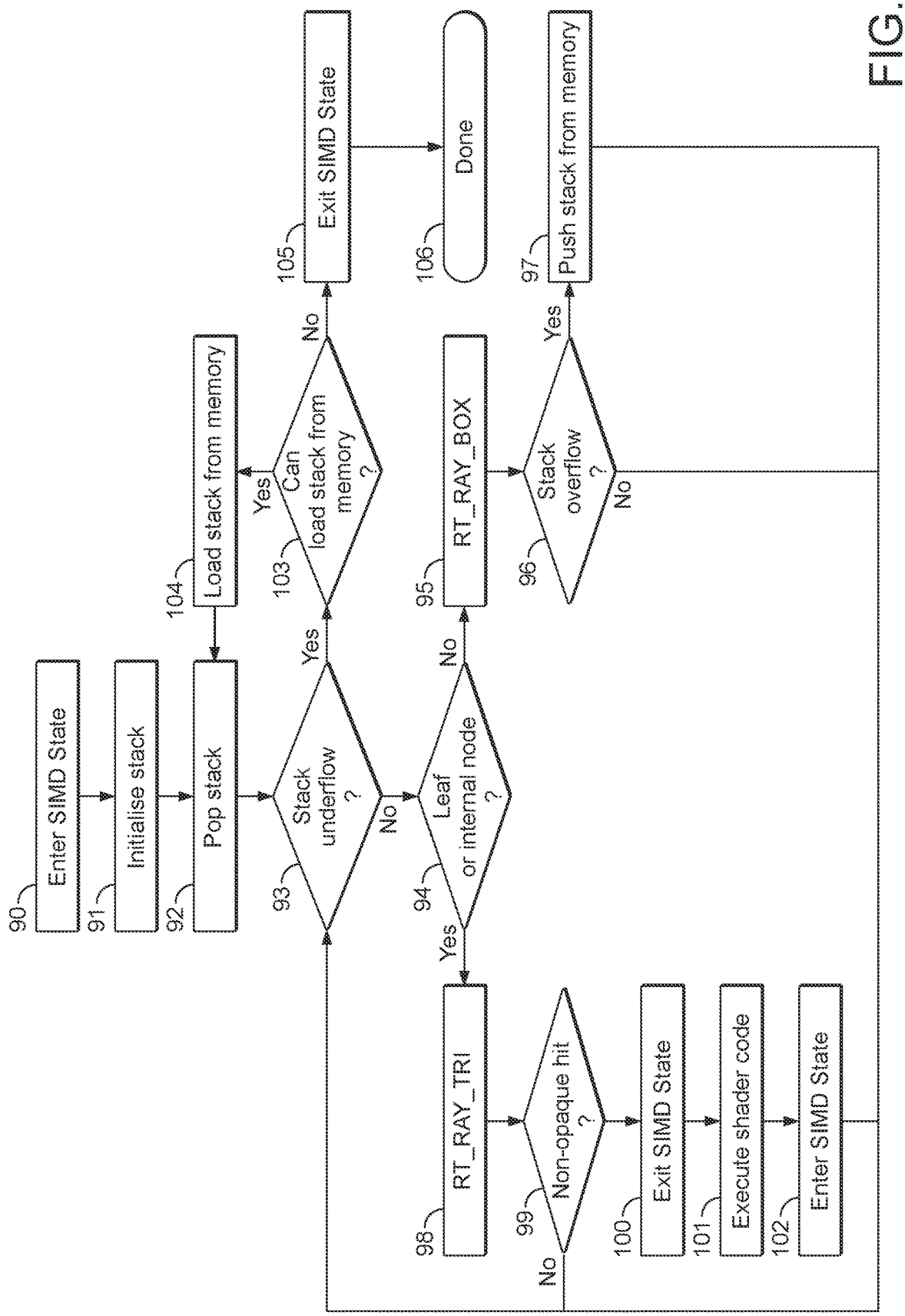
FIG. 9 is a flowchart showing the operation of a graphics processor in an embodiment of the technology described herein.

FIG. 9 is a flowchart showing the operation of a shader core 61 of the graphics processor 60 when performing a ray tracing-based rendering process to render a view of the scene in an embodiment of the technology described herein.

FIG. 9 shows the operation in respect of a given sampling position of the frame being rendered. This operation will be repeated for each sampling position of the frame being rendered, and by each respective shader core that is active and being used to render the frame.

As discussed above, in the present embodiments, sampling positions are rendered by generating respective execution threads for the sampling positions and then executing appropriate shader programs for those threads. Thus, the process will start with the thread creator 72 generating an appropriate execution thread corresponding to the sampling position that is being rendered. The execution thread will then execute an initial ray tracing shader program to perform the ray tracing-based rendering process for the sampling position.

In the present embodiments, the initial ray tracing shader program that is executed for a sampling position will, inter alia, include one or more instructions that when executed trigger the programmable execution unit 65 to send a message 75 to the intersection testing circuit 74 to perform the required ray-volume or ray-primitive intersection testing between the ray in question and a given node of the BVH tree to be tested against.

In the present embodiments, the shader program is executed by a group of plural execution threads (e.g. a warp), with each execution thread performing the traversal operation for a respective ray in a group of plural rays that are thereby caused to perform the traversal operation together, as a whole. To facilitate this, the shader program to perform the traversal operation may include an initial instruction that ensures (forces) all of the execution threads in the group of execution threads to be in an 'active' state, e.g. such that the traversal operation can then be performed using the execution thread group as a whole, e.g. in SIMD execution state.

Thus, as shown in FIG. 9, when, during execution of the initial ray tracing shader program for a sampling position, the programmable execution unit 65 encounters and executes such an 'Enter_SIMD_state" instruction (step 90), at this point it can be ensured that all of the execution threads in the group of execution threads executing the program are in an active (SIMD) state.

The traversal stack that is maintained for the group of execution threads can then be suitably initialised for the traversal operation (step 91).

The first entry in the traversal stack (e.g. the root node) is then popped from the stack in order to start the traversal operation (step 92).

At this point the root node will be the only entry in the traversal stack, such that there will be no stack underflow (step 93—No) and the shader program then proceeds to determine whether the node is leaf node or an internal node (step 94).

For the root node, and other internal nodes encountered during the traversal operation, it is then necessary to perform the required ray-volume intersection testing to determine whether the node represents any geometry that may be intersected by a ray in the group of rays that are performing the traversal operation together. This is done by including into the shader program an appropriate ray-volume testing instruction ('RT_RAY_BOX') that when executed (step 95) by the execution unit will trigger the execution unit to message the ray-volume intersection testing circuit 77 of the intersection testing circuit 74 to perform the desired ray-volume testing.

Figure 10:
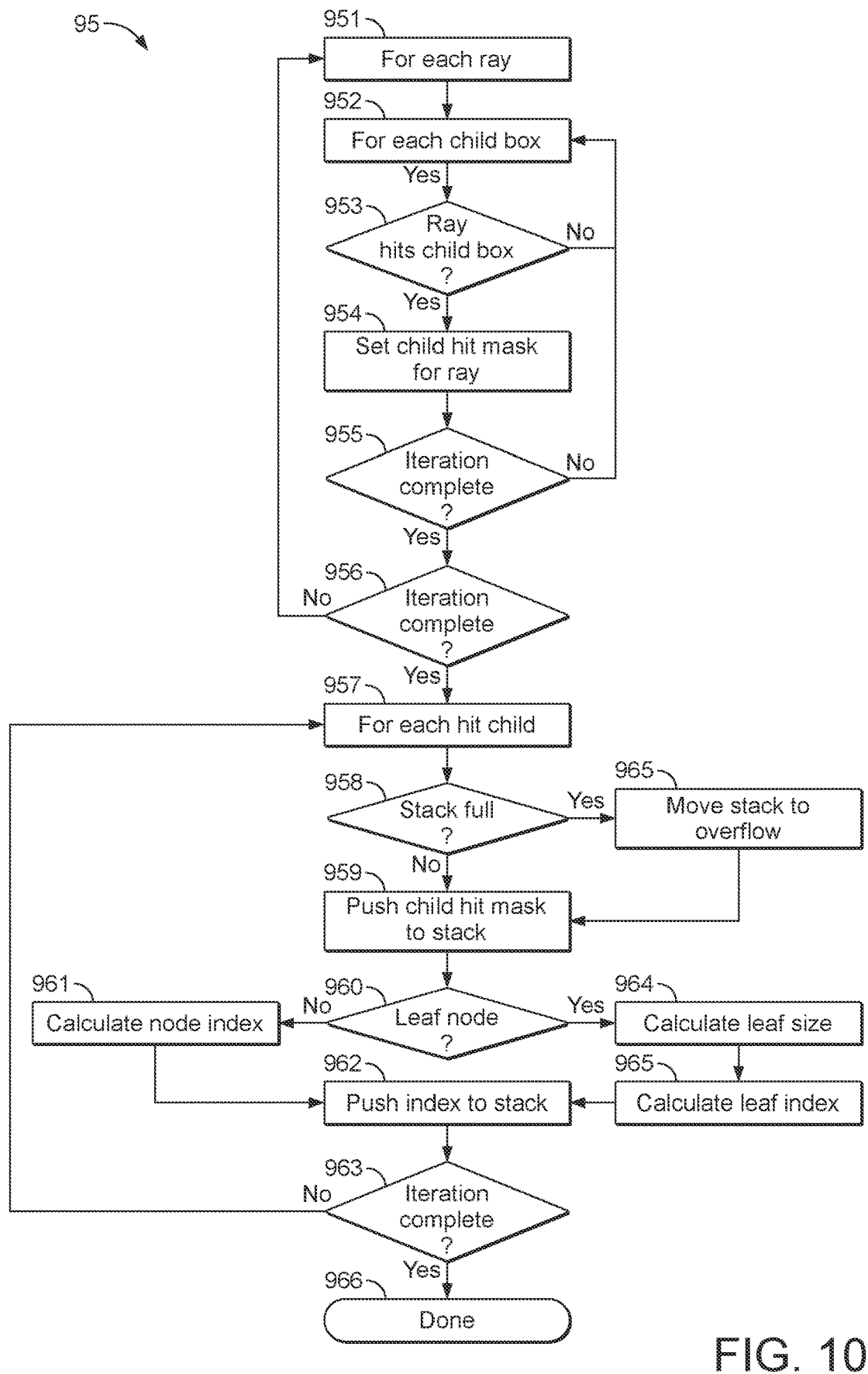
FIG. 10 is a flowchart showing a ray-volume intersection testing operation according to an embodiment of the technology described herein.

FIG. 10 is a flowchart showing a ray-volume intersection testing operation according to an embodiment of the technology described herein.

As shown in FIG. 10, when the ray-volume testing instruction ('RT_RAY_BOX') is executed in respect of a given node in the BVH tree, a first ray in the group of plural rays performing the traversal operation that need to be tested for intersection with the node (as indicated in the appropriate field 81 in the traversal stack) is selected (step 951), and this is then iteratively tested against each child node volume associated with the node in question (step 952). The child node volumes can be obtained (e.g. from memory) in any suitable and desired manner.

Thus, for each child node volume, it is determined whether the ray intersects with the child volume (step 953), and if the ray does intersect, a hit mask for the child node (field 81 in FIG. 8) is set accordingly to reflect this. If the ray does not intersect the first child node volume, the ray is then tested against the next child node volume, and so on, until the iteration for that ray over the child node volumes is finished (step 955). The testing then iterates over the rays that are to be tested against the node until all of the rays have been tested against all of the child node volumes (step 956).

For each child node volume that was intersected, a result of the intersection testing is then returned, with an appropriate entry being pushed to the traversal stack such that the child node can then be tested accordingly (step 957).

As part of this, it is first tested whether the pushing of the results of the intersection testing would cause the traversal stack to overflow, i.e. because the stack is full (step 958). So long as there are available entries in the traversal stack (step 958—No) a suitable entry is then pushed to the traversal stack, with the entry including the hit mask (field 81 in FIG. 8) for the child node, as well as the leaf count and indication of the child node (fields 82 and 83 in FIG. 8).

For instance, it is then determined whether the child node is a leaf node (step 960). If the node is not a leaf node, a node index can then be calculated indicating which child nodes are associated with the node (step 961) and pushed to the traversal stack accordingly. On the other hand, if the child is a leaf node, the leaf size is then calculated (step 964), and an appropriate leaf index calculated indicating which primitives are represented by the leaf node (step 955) which is then pushed to the traversal stack.

This is done for each child node that was determined as being intersected by a ray (step 963) until respective entries for each child node have been appropriately added into the traversal stack.

The result of the intersection testing is then returned accordingly, and pushed to the traversal stack for the traversal operation. In the event that the result of the intersection testing overflows the traversal stack (step 96—Yes), the entire traversal stack is then pushed to memory (step 97), and an indication of this is recorded into the traversal stack. This can then be checked (at step 93) and in the event that there has been an overflow event (step 93—Yes), it is then checked whether the stack can be loaded from memory (step 103), and if so the stack is then loaded in appropriately (step 104), and the stack entries popped (step 92) so that the traversal operation can continue.

On the other hand, if the stack cannot be loaded from memory, for any reason, in that case the traversal operation may be done (step 106), with the execution thread group first exiting the SIMD state (step 105) accordingly.

The traversal stack can thus be worked through in order to test the various nodes of the BVH tree to determine which nodes represent geometry that may be intersected by the rays in the group of rays performing the traversal operation together.

When the traversal operation reaches a leaf node at the end of given branch of the BVH tree, such that it is determined that the node is leaf node (at step 94), with the traversal operation therefore indicating that the leaf node represents geometry that may be intersected by a ray, the actual geometry intersections are then determined.

This can be done in various ways but in the present embodiments this is done by including into the shader program an appropriate instruction ('RT_RAY_TRI') that when executed (step 98) by the execution unit will trigger the execution unit to message the ray-primitive intersection testing circuit 75 of the intersection testing circuit 74 to perform the desired ray-primitive testing.

Figure 11:
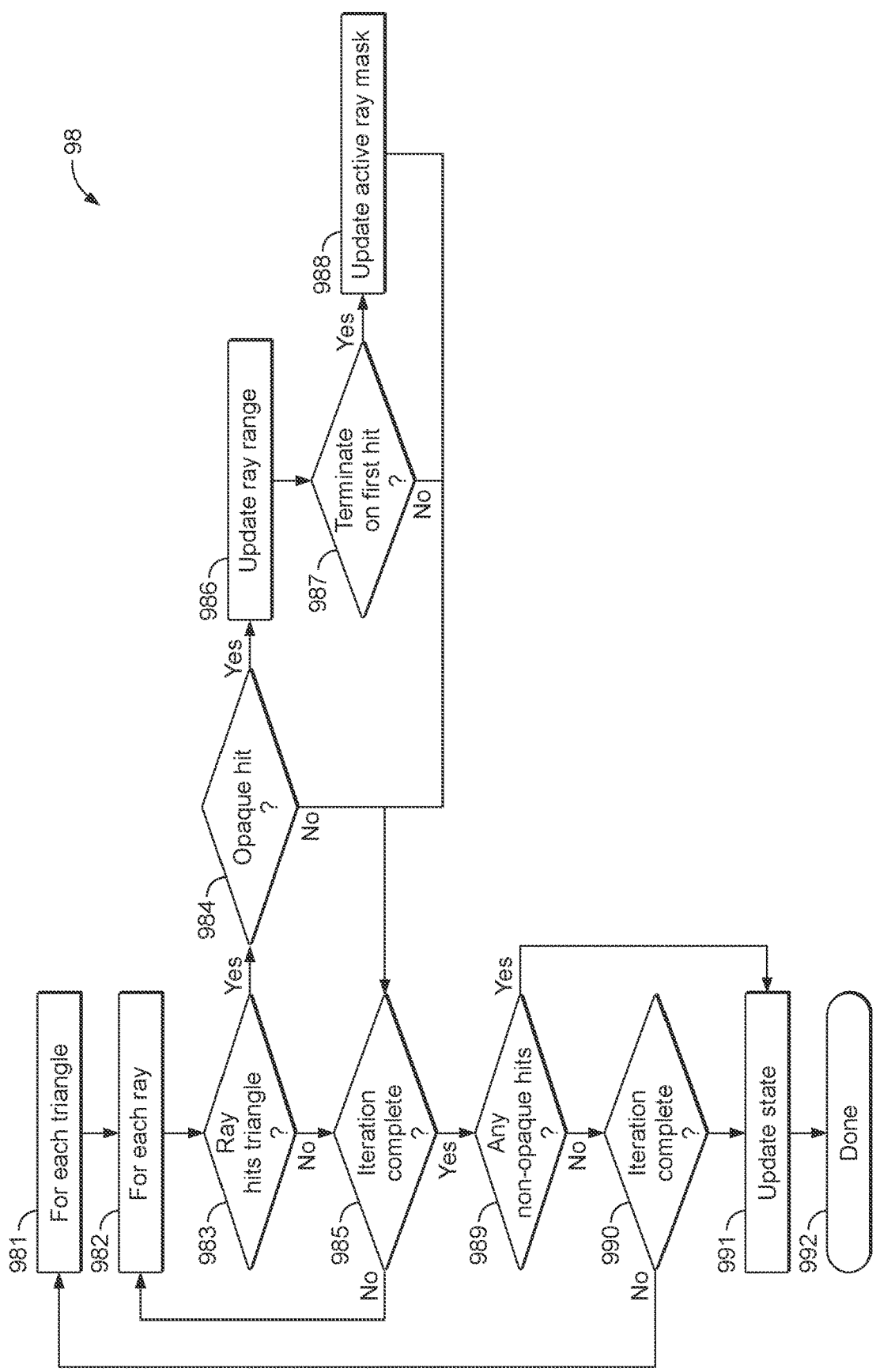
FIG. 11 is a flowchart showing a ray-primitive intersection testing operation according to an embodiment of the technology described herein.

FIG. 11 is a flowchart showing a ray-primitive intersection testing operation according to an embodiment of the technology described herein.

As shown in FIG. 11, in response to executing the ray-primitive intersection testing ('RT_RAY_TRI') instruction in respect of a leaf node, the set of primitives (e.g. triangles) represented by the leaf node are then loaded for testing.

For each primitive (triangle) represented by the leaf node (step 981), the rays that were determined to intersect the leaf node volume (as indicated by the hit mask, field 81 in FIG. 8) are then iteratively tested against the primitive (step 982) to determine whether or not the ray hits the primitive (step 983). If there are no hits, the next ray is then tested (step 985), and so on, until all of the rays have been tested against the primitive.

For any hits, it is then determined whether there is an 'opaque' hit (step 984). If the ray hits opaque geometry, the ray does not need to propagated further, and so the range can then be updated accordingly (step 986). It can then be determined whether the ray is flagged to terminate on the first hit (step 987). If yes, the hit mask (field 81 in FIG. 8) can be updated appropriately (step 988) and the testing can then move on the next ray.

Once all of the rays have been tested against the (first) primitive, it is then determined whether there were any non-opaque hits (step 989). For any rays that are determined to hit a 'non-opaque' primitive, the ray-primitive testing may need to terminate early, e.g., with the result being returned to the shader program accordingly, such that the shader program can determine how to handle the non-opaque hit (i.e. whether or not the hit needs to be counted). Thus, in the event that there are any non-opaque hits, the ray-primitive testing may be terminated early (without testing any more primitives), with the traversal state being updated accordingly (step 991). In that case, the ray-primitive intersection testing is terminated for all of the rays, such that the group of rays remains together for the traversal operation.

Otherwise, if there are no non-opaque hits, the ray-primitive intersection testing moves on to testing the next primitive (step 990), and iteratively tests the rays in the group of rays for intersection with that primitive, and so on, until all of the primitive for the leaf node have been tested. Once the ray-primitive intersection testing has finished, the traversal state can thus be updated accordingly with the result of the intersection testing (step 991), and the operation is then done (step 992).

For a given ray that is to be intersection tested against a 'batch' of primitives (e.g. triangles) represented by an end node, it is desirable to report only a single intersection ("hit"). That is, when a ray is determined to intersect a shared boundary between two or more primitives, the ray-primitive intersection testing should, and in the present embodiments does, report only one of the primitives as being intersected, otherwise there may be various artefacts in the final render output. This problem is referred to as "watertightness".

In the present embodiments, the ray-primitive intersection is performed iteratively, as shown in FIG. 11, with individual primitives provided separately, with no tracking information for whether the ray has had any hits on nearby/adjacent primitives. Also, each primitive is provided as three points only, e.g. with no metadata annotations, etc., that can be used for resolving this issue.

Thus, in the present embodiments, a tie-breaking scheme is provided that can determine whether a ray should fall inside or outside a primitive based (only) on the geometrical definitions of the ray and primitive pair that are being tested (such that the tie-breaking scheme is not dependent on the order in which the primitives are tested, or the result of the testing for any other primitives, etc.).

For instance, if a ray hits an edge between two primitives that are front-facing as seen from the ray (e.g. as shown in FIG. 12A), then the present embodiment invokes a tie-break test so that when the primitives are submitted one by one, exactly one of them will register an inside-hit, and the other one will register a miss.

Similarly, if a ray hits a vertex that is shared between multiple primitives, all of which are front-facing as seen from the ray (e.g. as shown in FIG. 12B), the tie-break test should be configured such that if the primitives are submitted one by one, the tie-break test will report exactly one of them as an inside-hit, and all the other ones will be reported as outside. Thus, the primitive that hits should depend only on its geometry, not on the submission order.

In the present embodiments a common test is provided for both of these situations, in particular such that instances of a ray intersecting a vertex can be implemented as two applications of the tie-break test for the edge for the two edges that define the vertex (with the ray counted as inside the primitive if both applications of the edge test return "inside").

Assuming that all the primitives have the same winding order (i.e. all clockwise), the following tie-break procedure can be used, as shown in FIG. 13.

Firstly, in step S1, a vector "Dp" is computed that is perpendicular to the direction of the ray. For instance, given a direction-vector D=(Dx,Dy,Dz) for the ray, a perpendicular-vector can be computed as Dp=(−Dy,Dx,0) except when Dx==0, in which case it can be computed as Dp=(1,Dx,0). This operation in an embodiment uses one compare-against-zero and one MUX for the computation.

Then, in step S2, for any given edge that a tie-break is to be performed for, a vector is computed for the direction of that edge (p1−p0). The vector from one edge to another needs 3 subtractions, but since this feeds into a dot-product where the Z component of the other vector is 0, the calculation only actually needs two of the subtractions, and this is in an embodiment done in the present embodiment to simplify the calculations, e.g. to facilitate hardware implementation.

In step S3, the scalar (dot) product of these two vectors is then computed: Dp*(p1−p0). Given that the perpendicular-vector Dp can be set up to have its Z-component to be zero, only two multiplications are needed rather than three. Thus, the scalar (dot) product is in an embodiment performed in two dimensions to simplify the calculations. Additionally, since the tie-break test is only interested in the sign (positive/negative/zero) of this dot-product, not its numerical magnitude, it is sufficient to just compare the two multiply-results; there's no need to actually add them together. Again, this helps simplify the calculations.

The sign of the dot-product is then used to determine whether to count the ray as falling inside or outside the primitive. Thus, in step S4, if the dot-product is positive, the ray is then counted as "inside", whereas if the dot-product is negative, then the ray is counted as "outside".

In the case where the dot-product is exactly zero, then a further lexicographic comparison using the two vertices that form the edge can be performed, in step S5, to determine whether to report the ray as inside or outside the primitive. For instance, the vertices for the primitive will typically be represented as tuples of three FP32-values (x,y,z). The bit representation of the three values can thus be used, e.g. by concatenating them into a 96-bit vector, to determine a value for the vertex. A lexicographic comparison between two vertices can then be obtained by performing a 96-bit unsigned integer comparison between their two values. For instance, if the second vertex is "greater than" the first one according to such a test, then the ray is counted as "inside", else count as "outside".

It will be appreciated that such a maximally-simple lexicographic ordering has no geometric meaning; it exists purely to provide tiebreak in cases where a geometric tiebreak is not easily attained. Thus, any other suitable values could be used for this purpose.

For example, to add some geometric meaning to the lexicographic ordering, one could alternatively prepare the 96-bit vectors by, e.g., for each FP32 value, first XORing all the exponent/mantissa bits with the sign-bit, then flipping the sign-bit, and then assembling the 96-bit vector. This would produce an ordering where vertices are ordered by Z first, Y second, X last. This may also provide some improvements. For instance, with the above construction of the perpendicular-vector Dp, the lexicographic-test would always get invoked for purely-vertical edges; in such a case, having a test that flips polarity when Z coordinates transitions from negative to positive might be an issue. The alternative lexicographic ordering with the XORing solves this problem.

The tie-break scheme shown in FIG. 13 will thus give a deterministic result for any given ray/primitive pair being tested such that it can be determined whether the ray should be reported as falling inside or outside the primitive, without having to consider any other primitives.

For instance, for tiebreak of an edge, if an edge is shared between two primitives (of the same winding), then it will appear twice, with opposite vertex orders. This will flip the sign of the dot-product when the test is performed in respect of the different primitives, such that for one primitive the dot-product will be positive (e.g. such that the ray is determined to fall "inside"), whereas for the other primitive the dot-product will be negative (unless the dot-product is exactly 0, in which case it will flip the lexicographic test). Thus the above tie-break scheme can efficiently handle edge-tie breaks (e.g. as shown in FIG. 12A).

For tiebreak of a vertex (e.g. as shown in FIG. 12B), the relevant primitives will, from the viewpoint of the ray, form a primitive fan extending all the way around the vertex. The perpendicular-vector defines a plane that the ray lies in, that also cuts this primitive fan in half. The tie-break test for a primitive defined by its vertices (p0,p1,p2) where, if p1 is the center-vertex that lies within this plane, then p0 lies below the plane and p2 lies above should be configured such that there can be only one such primitive in the fan, assuming and the primitives all have the same winding. In this case, the vectors p1−p0 and p2−p1 will both point up from the plane. This can be identified by taking the dot-products between these two vectors and the perpendicular-vector. This will result in two positive dot-products only for the triangle that has p0 below the plane and p2 above it.

(For the case where one of p0 or p2 lies exactly on the plane, the tie-break scheme can again use the lexicographic test to arbitrarily resolve it as below or above; for the case where both p0 and p2 lie in the plane, there is a triangle that's either degenerate or exactly coincident with the ray, in which case it doesn't really matter whether 1 or 2 hits are returned for the fan as a whole).

This way, two applications of the above test should suffice, and there is provided a tie-breaking test that can resolve vertex intersections.

The approach tie-break scheme thus provides a particularly efficient solution with relatively low area cost, and that can be readily implemented in hardware, e.g. as part of the intersection testing circuit 74.

However, other suitable tie-breaking arrangements could also be used in combination with the present embodiments.

The traversal operation thus uses the information provided about the rays to traverse the ray tracing acceleration data structure to determine geometry for the scene to be rendered that may be intersected by the ray in question. In the present embodiments, the traversal process operates to traverse the ray tracing acceleration data structure based on the position and direction of the ray, to determine for each volume of the scene that the ray passes through in turn, whether there is any geometry in the volume (indicated by the ray tracing acceleration data structure), until a first (potential) intersection with geometry defined for the scene is found for the ray.

Other arrangements would, of course, be possible. The ray tracing acceleration data structure traversal for a ray can comprise traversing a single ray tracing acceleration data structure for the ray, or traversing plural ray tracing acceleration data structures for the ray (e.g. in the case where the overall volume of, and/or geometry for, the scene is represented by plural different ray tracing acceleration data structures, and/or where an initial ray tracing acceleration data structure that indicates further ray tracing acceleration data structures to be traversed is first traversed).

Once the ray tracing acceleration data structure traversal operation 74 has performed the necessary traversal or traversals for a ray, and determined geometry that is intersected by the ray, that information is returned to the programmable execution unit 65, for the programmable execution unit to perform further processing for the sampling position in question as a result of, and based on, the result of the determined traversal for the ray.

For instance, in the present embodiments, the programmable execution unit 65 may then execute further "surface processing" shader programs that will perform further processing for the sampling position in question based on the result of the ray tracing acceleration data structure traversal for the ray.

In the present embodiments, there are plural different sets of further "surface processing" shader programs that can be executed, in dependence upon the type of geometry that has been determined by the ray tracing acceleration data structure traversal circuit as being intersected by a ray (and in particular in dependence upon the particular surface type (surface property or properties) of the geometry determined by the ray tracing acceleration data structure traversal circuit).

Thus the process operates to select the further "processing" shader program to be executed to perform further processing for the sampling position corresponding to a ray in accordance with the type of geometry (and in particular the surface type), that has been determined by the ray tracing acceleration data structure traversal circuit as being intersected by the ray.

In order to perform and control this operation, in the present embodiments, the ray tracing acceleration data structure traversal circuit triggers the generation of an execution thread that is to execute (and that executes) the selected further "surface processing" shader program for the geometry type in question.

The programmable execution unit 65 then executes the selected further shader program for the generated thread (e.g. step 45 in FIG. 4).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor).

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, appropriate 'ray-volume' and 'ray-primitive' intersection testing instructions to cause the programmable execution unit to send a message to the intersection testing circuit 74 to perform the desired intersection testing.

The compilation process (the compiler) can use any suitable and desired compiler techniques for this.

Figure 14:
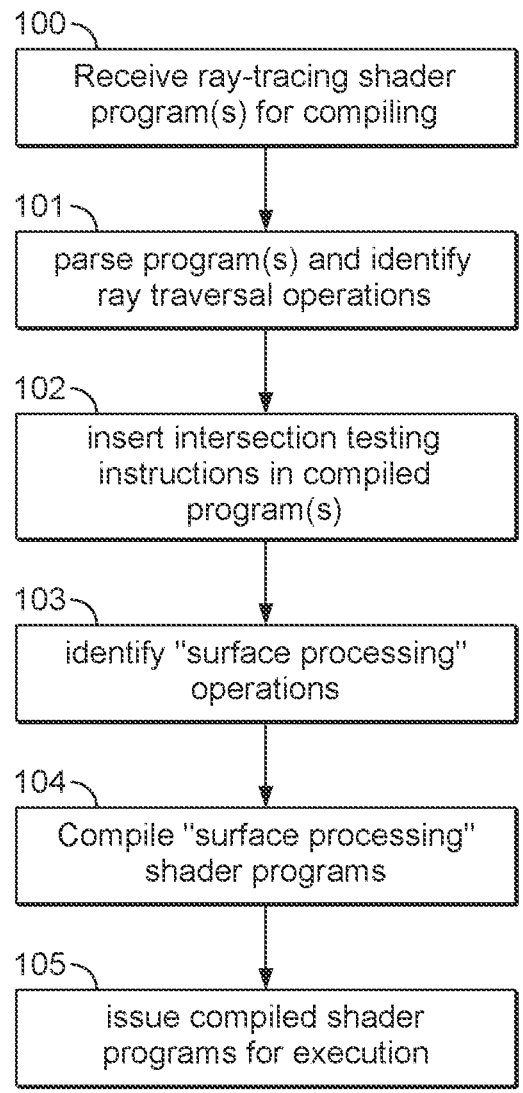
FIG. 14 shows an embodiment of a shader program compilation process.

FIG. 14 shows an embodiment of the compilation process.

As shown in FIG. 14, the compiler for the graphics processor will receive a ray tracing-based rendering program or programs for compiling (step 100).

The compiler will then analyse the shader program code that is provided, to identify instances of required intersection testing during the ray traversal operations in that shader program code (step 101), and to insert corresponding instruction(s) at the appropriate point(s) in the compiled shader program(s) (step 102).

The required "surface processing" operations for the intersected geometry can also be identified (step 103) and respective "surface processing" shader programs compiled (step 104).

The compiled shader programs will then be issued to the graphics processor for execution (e.g. stored in appropriate memory of and/or accessible to the graphics processor, so that the graphics processor can fetch the required shader programs for execution as required) (step 105).

The geometry associated with a given leaf node may be obtained in any suitable and desired manner. In an embodiment, it is obtained from memory. In that case, the geometry (e.g. a set of primitives) associated with the leaf node may be stored in such a manner to facilitate memory access, e.g. such that all of the geometry (primitives) to be tested for a given leaf node can in an embodiment be obtained from external (e.g. main) memory in a single memory transaction (burst). For example, in an embodiment, the number of primitives that are associated with a given leaf node is selected such that all of the primitives stored within a block of memory can be obtained from external (e.g. main) memory in a single memory transaction (burst). For example, where a cache system is used, this block size may correspond to a set of one or more (integer) cache lines. This can therefore facilitate an overall more efficient ray-primitive intersection testing.

In embodiments, the primitives represented by a respective leaf node of the BVH are also stored in memory an efficient manner to facilitate improved memory access. For example, a primitive is often expressed as a triangle, and therefore has three vertices, (x0, y0, z0), (x1, y1, z1) and (x2, y2, z2). Therefore, where each axis is expressed as a 32-bit floating point number, each vertex is specified using 12 bytes of data and a primitive specified using 36 bytes of data. To facilitate memory access, in embodiments, a plurality of primitives are thus stored together in a single data structure that fits within an integer number of cache lines. Again, this has the benefit that by storing a plurality of primitives in a BVH leaf node, that multiple rays in the group of plural rays that are performing the traversal at the same time can be tested against multiple ray-primitive intersects in one processing instance, thus reducing the number of memory access operations.

For example, in embodiments, a leaf node may comprise three primitives (triangles). In that case, each triangle comprises three vertices, each vertex comprising three 32-bit floating point numbers. Each triangle also comprises validity and opaqueness fields. These fields indicate whether the corresponding triangle is valid (is used), and if so, whether the triangle is opaque.

FIG. 15 shows an example of a data structure 1500 for storing such data in memory. In particular, FIG. 15 shows a 128 byte data structure comprising 32 lines each capable of storing 32 bits. This data structure can therefore fit within two 64 byte cache lines. As shown in FIG. 15, the primitive vertices in this example are stored as 32-bit floating point co-ordinate values for each axis, where 'tri_0_vertex_0_x' represents the x co-ordinate of the first vertex (vertex 0) for the first primitive (triangle 0), 'tri__0_vertex_0_y' and 'tri_0_vertex_0_z' are the corresponding y and z co-ordinates, and so on.

Thus, as shown in FIG. 15, for each primitive there are stored three vertices, with three co-ordinates (x,y,z) being stored for each vertex. In this example, 36 bytes are thus required for storing each primitive. In FIG. 15, three primitives are thus stored together in the same 128 byte data structure 1500. Other arrangements would of course be possible.

Various other primitive data or metadata may also be stored in the same data structure 1500. For instance, as shown in FIG. 15, there is also stored in the same data structure 1500 respective bits V0, V1, V2 indicating whether the primitives are valid. Also stored are respective bits 00, 01, 02 indicating whether the primitives are opaque. Other arrangements would of course be possible for storing such metadata.

It can be seen from the above that the technology described herein, in its embodiments at least, can provide a more efficient process for performing ray tracing-based rendering. This is achieved, in the embodiments of the technology described herein at least, by using an intersection testing circuit to perform ray-volume intersection testing for rays being processed, but with other processing for the ray tracing-based rendering being performed by executing an appropriate shader program or programs using a programmable execution unit of the graphics processor.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when rendering a frame that represents a view of a scene comprising one or more objects using a ray tracing process, the graphics processor comprising a programmable execution circuit operable to execute programs to perform graphics processing operations, and in which a program can be executed by groups of plural execution threads together;
the method comprising:
when a group of execution threads is executing a program to perform a ray tracing operation for a corresponding group of rays that are performing a traversal of the ray tracing acceleration data structure together, in response to the execution threads executing a set of one or more ray-primitive testing instructions that are included in the program in respect of a set of primitives defined for the scene:
testing one or more rays from the group of plural rays that are performing the ray tracing operation together for intersection with the primitives in the set of primitives being tested, wherein the ray-primitive intersection testing is configured such that when a ray intersects a shared boundary of two or more primitives in the subset of primitives being tested, the ray-primitive intersection testing will return a result that only one of the primitives is intersected by the ray, wherein the primitives are defined in terms of a set of vertices with edges connecting the primitive's vertices, and wherein when the ray-primitive intersection testing determines that a ray intersects an edge of primitive, the ray-primitive intersection testing further comprises: determining whether the ray falls inside or outside of the primitive by: determining a perpendicular-ray vector that is perpendicular to the direction of the ray; determining an edge vector in the direction of the edge that the ray intersects; determining a dot product of the perpendicular-ray vector and the edge vector; and using the sign of the dot product to determine whether the ray is inside or outside the primitive; and
returning a result of the intersection testing for the ray tracing operation.

2. The method of claim 1, wherein the graphics processor further comprises an intersection testing circuit operable to test rays for intersection with the sets of primitives defined for the scene, and wherein the set of one or more ray-primitive testing instructions, when executed by execution threads of the group of plural execution threads, will cause the execution circuit to message the intersection testing circuit to perform the testing of the one or more rays from the group of plural rays that are performing the ray tracing operation together for intersection with the set of primitives to be tested and to return the result of the intersection testing to the execution circuit.

3. The method of claim 2, wherein in response to execution circuit messaging the intersection testing circuit to perform the ray-primitive intersection testing, the intersection testing circuit loads in a set of primitive data defining the primitives for the set of primitives being tested for testing; the intersection testing circuit further performing one or more culling operations using the loaded primitive data, with a result of the culling operations being returned to the execution circuit.

4. The method of claim 1, wherein the ray-primitive intersection testing is performed in an iterative manner such that individual primitives in the set of primitives being tested are tested for intersection with the one or more rays from the group of plural rays performing the ray tracing operation separately, in a sequential manner.

5. The method of claim 4, wherein in response to the ray-primitive intersection testing determining that a ray intersects a non-opaque primitive, the ray-primitive testing operation is terminated early, and wherein the ray tracing acceleration data structure is configured such that any non-opaque primitives in a set of primitives to be tested are tested first.

6. The method of claim 1, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing acceleration data structure comprising a set of end nodes representing respective subsets of primitives defined for the scene that occupies the volume that the end node corresponds to; the ray tracing process comprising performing for a plurality of rays a traversal of the ray tracing acceleration data structure to determine which end nodes contain geometry that may be intersected for the rays and then determining, by testing the rays for intersection with the subsets of primitives represented by the end nodes of the acceleration data structure, which, if any, geometry for the scene is intersected by the rays; and wherein the set of primitives being tested corresponds to a subset of primitives represented by a given end node of the ray tracing acceleration data structure.

7. The method of claim 6, wherein the group of plural rays perform a traversal of the ray tracing acceleration data structure together to determine which end nodes represent geometry that is potentially intersected and for which end nodes ray-primitive intersection testing is thus required, wherein for each end node that is determined to contain geometry that is potentially intersected, an indication is provided of at least a subset of rays in the group of rays performing the ray tracing operation together potentially intersect the geometry for that end node, wherein in response to the ray-primitive intersection testing instruction being executed, the ray-primitive intersection testing is performed for the indicated subset of rays.

8. The method of claim 1, wherein when a ray is determined to intersect a shared vertex of two or more primitives, the resolving operation is performed for each edge defining the vertex.

9. A method of operating a graphics processor when rendering a frame that represents a view of a scene comprising one or more objects using a ray tracing process comprising testing a ray for intersection with a primitive, wherein the primitive is defined in terms of a set of vertices with edges connecting the primitive's vertices, the testing of the ray for intersection with the primitive comprising:

determining when the ray intersects an edge of the primitive, and in response to determining that the ray intersects an edge of the primitive:
determining a perpendicular-ray vector that is perpendicular to the direction of the ray;
determining an edge vector in the direction of the edge of the primitive that the ray intersects with;
determining a dot product of the perpendicular-ray vector and the edge vector; and
determining that the ray is either inside or outside the primitive depending on the sign of the dot product.

10. The method of claim 9, wherein when the dot product is exactly zero, a further comparison of one or more values generated using the vertices defining the edge is used to determine whether ray falls inside or outside the primitive.

11. A graphics processor that is operable to render a frame that represents a view of a scene comprising one or more objects using a ray tracing process,
the graphics processor comprising:
a programmable execution circuit operable to execute programs to perform graphics processing operations, and in which a program can be executed by groups of plural execution threads together;
wherein the execution circuit is configured such that, when a group of execution threads is executing a program to perform a ray tracing operation for a corresponding group of rays that are performing a traversal of the ray tracing acceleration data structure together, in response to the execution threads executing a set of one or more ray-primitive testing instructions that are included in the program in respect of a set of primitives defined for the scene:
the execution circuit triggers testing of one or more rays from the group of plural rays that are performing the ray tracing operation together for intersection with the primitives in the set of primitives being tested, wherein the ray-primitive intersection testing is configured such that when a ray intersects a shared boundary of two or more primitives in the subset of primitives being tested, the ray-primitive intersection testing will return a result that only one of the primitives is intersected by the ray, wherein the primitives are defined in terms of a set of vertices with edges connecting the primitive's vertices, and wherein when the ray-primitive intersection testing determines that a ray intersects an edge of primitive, the ray-primitive intersection testing further comprises:
determining whether the ray falls inside or outside of the primitive by: determining a perpendicular-ray vector that is perpendicular to the direction of the ray; determining an edge vector in the direction of the edge that the ray intersects; determining a dot product of the perpendicular-ray vector and the edge vector; and using the sign of the dot product to determine whether the ray is inside or outside the primitive, and
wherein a result of the intersection testing is then returned for the ray tracing operation.

12. The graphics processor of claim 11, wherein the graphics processor further comprises an intersection testing circuit operable to test rays for intersection with the sets of primitives defined for the scene, and wherein the set of one or more ray-primitive testing instructions, when executed by execution threads of the group of plural execution threads, will cause the execution circuit to message the intersection testing circuit to perform the testing of the one or more rays from the group of plural rays that are performing the ray tracing operation together for intersection with the set of primitives to be tested and to return the result of the intersection testing to the execution circuit.

13. The graphics processor of claim 12, wherein in response to the execution circuit messaging the intersection testing circuit to perform the ray-primitive intersection testing, the intersection testing circuit loads in a set of primitive data defining the primitives for the set of primitives being tested for testing; the intersection testing circuit further performing one or more culling operations using the loaded primitive data, with a result of the culling operations being returned to the execution circuit.

14. The graphics processor of claim 11, wherein the ray-primitive intersection testing is performed in an iterative manner such that individual primitives in the set of primitives being tested are tested for intersection with the one or more rays from the group of plural rays performing the ray tracing operation separately, in a sequential manner.

15. The graphics processor of claim 14, wherein in response to the ray-primitive intersection testing determining that a ray intersects a non-opaque primitive, the ray-primitive testing operation is terminated early, and wherein the ray tracing acceleration data structure is configured such that any non-opaque primitives in a set of primitives to be tested are tested first.

16. The graphics processor of claim 11, wherein the ray tracing process uses a ray tracing acceleration data structure indicative of the distribution of geometry for the scene to be rendered to determine geometry for the scene that may be intersected by a ray being used for a ray tracing operation, the ray tracing acceleration data structure comprising a plurality of nodes, each node associated with a respective one or more volumes within the scene, the ray tracing acceleration data structure comprising a set of end nodes representing respective subsets of primitives defined for the scene that occupies the volume that the end node corresponds to; the ray tracing process comprising performing for a plurality of rays a traversal of the ray tracing acceleration data structure to determine which end nodes contain geometry that may be intersected for the rays and then determining, by testing the rays for intersection with the subsets of primitives represented by the end nodes of the acceleration data structure, which, if any, geometry for the scene is intersected by the rays; and wherein the set of primitives being tested corresponds to a subset of primitives represented by a given end node of the ray tracing acceleration data structure.

17. The graphics processor of claim 16, wherein the group of plural rays perform a traversal of the ray tracing acceleration data structure together to determine which end nodes represent geometry that is potentially intersected and for which end nodes ray-primitive intersection testing is thus required, wherein for each end node that is determined to contain geometry that is potentially intersected, an indication is provided of at least a subset of rays in the group of rays performing the ray tracing operation together potentially intersect the geometry for that end node, wherein in response to the ray-primitive intersection testing instruction being executed, the ray-primitive intersection testing is performed for the indicated subset of rays.

* * * * *